(12) United States Patent
Richardson et al.

(10) Patent No.: US 7,362,714 B2
(45) Date of Patent: *Apr. 22, 2008

(54) PACKET NETWORK MONITORING DEVICE

(75) Inventors: William M. Richardson, Warwick, NY (US); Leslie H. Swanson, Tewksbury, MA (US); Ashwin Kovummal, Stamford, CT (US); Sandeepan Mukherjee, Stamford, CT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 437 days.

This patent is subject to a terminal disclaimer.

(21) Appl. No.: 10/797,984

(22) Filed: Mar. 11, 2004

(65) Prior Publication Data

US 2005/0058076 A1   Mar. 17, 2005

Related U.S. Application Data

(63) Continuation of application No. 09/429,458, filed on Oct. 28, 1999, now Pat. No. 6,795,402, which is a continuation of application No. 08/619,934, filed on Mar. 18, 1996, now abandoned.

(60) Provisional application No. 60/010,719, filed on Jan. 29, 1996.

(51) Int. Cl.
   *G01R 31/28* (2006.01)

(52) U.S. Cl. .................. 370/242; 370/245; 324/522

(58) Field of Classification Search ............... 370/241, 370/245, 247, 248, 252–253; 324/522, 533, 324/534, 628

See application file for complete search history.

(56) References Cited

U.S. PATENT DOCUMENTS

| 3,434,049 A | 3/1969 | Frye |
| 4,580,872 A | 4/1986 | Bhatt et al. |

(Continued)

FOREIGN PATENT DOCUMENTS

DE   32 46 241   6/1984

(Continued)

OTHER PUBLICATIONS

Derwent English Abstract for DE 32 46 241.

(Continued)

*Primary Examiner*—Steven Nguyen
(74) *Attorney, Agent, or Firm*—Fogg & Powers LLC

(57) ABSTRACT

A network diagnostic device is disclosed that digitally samples the voltages on the cabling of the network, but does so at a much higher rate and with greater resolution then is required to minimally detect digital transmissions on the cabling. This sampling provides information on the analog characteristics of digital, noise, and interference signals on the network. Thus, network problems can be precisely diagnosed. The device includes a fast digitizer with a long memory and a system processor that statistically analyzes the signal events captured by the digitizer. The invention is also capable of performing time domain reflectometry (TDR) analysis of a functioning network. This is accomplished by placing a TDR signal on the network surrounded by a transmission that the network devices will interpret as a broadcast diagnostic packet. This will cause the network nodes to ignore the transmission. The digitizer, however, is able to detect the networks response to the TDR signal. Methods for identifying unknown network sources and Manchester decoding are also disclosed.

12 Claims, 26 Drawing Sheets

U.S. PATENT DOCUMENTS

| | | | |
|---|---|---|---|
| 4,766,386 A | 8/1988 | Oliver et al. | |
| 4,890,278 A | 12/1989 | Felker et al. | |
| 5,048,009 A | 9/1991 | Conrad | |
| 5,115,449 A | 5/1992 | Lockyer et al. | |
| 5,185,735 A | 2/1993 | Ernst | |
| 5,198,805 A | 3/1993 | Whiteside et al. | |
| 5,226,036 A | 7/1993 | Riley et al. | |
| 5,231,593 A | 7/1993 | Notess | |
| 5,243,543 A | 9/1993 | Notess | |
| 5,293,635 A | 3/1994 | Faulk, Jr. et al. | |
| 5,309,428 A | 5/1994 | Copley et al. | |
| 5,329,519 A | 7/1994 | I'Anson | |
| 5,341,400 A | 8/1994 | Davis | |
| 5,365,509 A | 11/1994 | Walsh | |
| 5,367,670 A | 11/1994 | Ward et al. | |
| 5,377,196 A | 12/1994 | Godlew et al. | |
| 5,381,348 A | 1/1995 | Ernst et al. | |
| 5,382,910 A | 1/1995 | Walsh | |
| 5,383,178 A | 1/1995 | Unverrich | |
| 5,387,902 A | 2/1995 | Lockyer et al. | |
| 5,394,401 A * | 2/1995 | Patrick et al. | 370/434 |
| 5,425,017 A | 6/1995 | Copley et al. | |
| 5,436,555 A | 7/1995 | Locke et al. | |
| 5,461,318 A | 10/1995 | Borchert et al. | |
| 5,463,735 A | 10/1995 | Pascucci et al. | |
| 5,477,531 A | 12/1995 | McKee et al. | |
| 5,532,603 A | 7/1996 | Bottman | |
| 5,539,659 A | 7/1996 | McKee et al. | |
| 5,570,029 A | 10/1996 | Bottman et al. | |
| 5,577,023 A | 11/1996 | Marum et al. | |
| 5,586,054 A | 12/1996 | Jensen et al. | |
| 5,614,905 A | 3/1997 | Crane | |
| 5,619,532 A | 4/1997 | Tani et al. | |
| 5,664,105 A | 9/1997 | Keisling et al. | |
| 5,703,883 A | 12/1997 | Chen | |
| 6,016,464 A | 1/2000 | Richardson | |
| 6,795,402 B1 * | 9/2004 | Richardson et al. | 370/241 |

FOREIGN PATENT DOCUMENTS

| | | |
|---|---|---|
| EP | 0 551 695 | 7/1993 |
| EP | 0 675 607 | 10/1995 |
| EP | 0 474 379 | 11/1995 |
| EP | 0 683 567 | 11/1995 |
| EP | 0 480 555 | 9/1996 |
| EP | 0 601 768 | 2/2002 |
| EP | 0 691 546 | 8/2002 |

OTHER PUBLICATIONS

R. M. Metcalfe, "Ethernet Chip Bugs? I'm Sorry to Say It's True," Info World Publishing Company, vol. 15, No. 46, p. 61(1) (Nov. 15, 1993).

"Performance Problems on High Utilization Ethernets," Newsgroups: comp.dcom.lans.ethernet, From: pat@prnd.rose.hp.com (Pat Thaler) (Oct. 20, 1993).

Performance Problems on High Utilization Ethernets, Newsgroups: comp.dcom.lans.ethernet, From: wirish@parc.xerox.com (Wes Irish) (Oct. 16, 1993).

R.M. Metcalfe, "Ethernet Elders Confirm the Chip Bug Scandal," InfoWorld 1994, From the Ether, vol. 16, Issue 11, p. 46(1) (Mar. 14, 1994).

R.M. Metcalfe, "Ethernet Vendors Testify in Tailgate Scandal," InfoWorld 1994, From the Ether, vol. 16, Issue 12, p. 50(1) (Mar. 21, 1994).

* cited by examiner

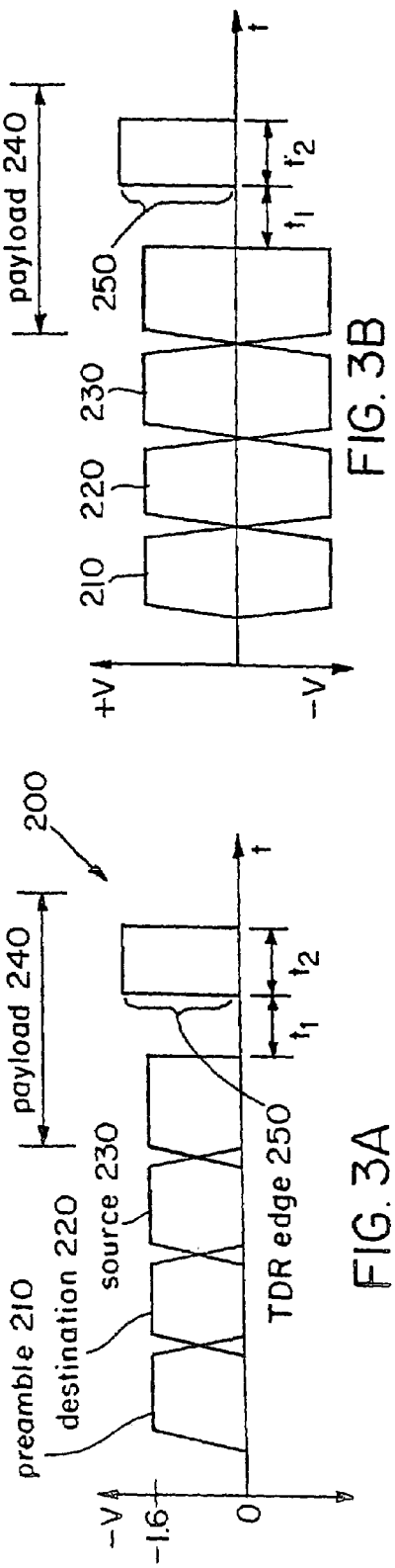
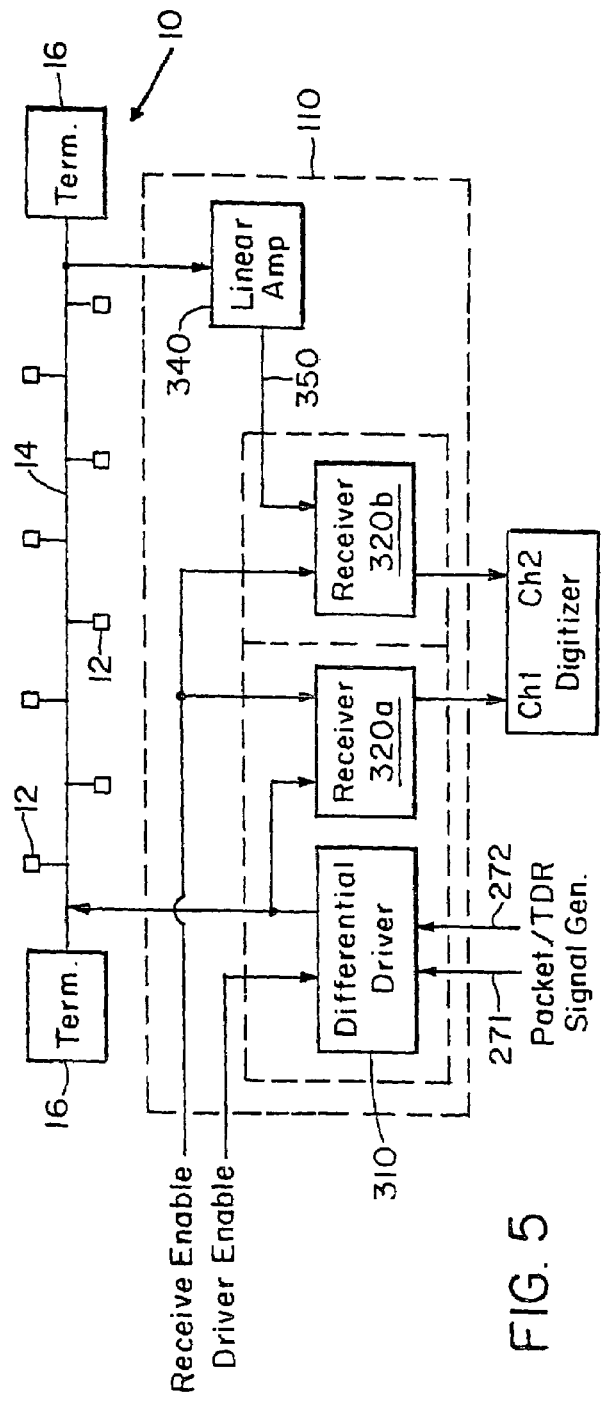

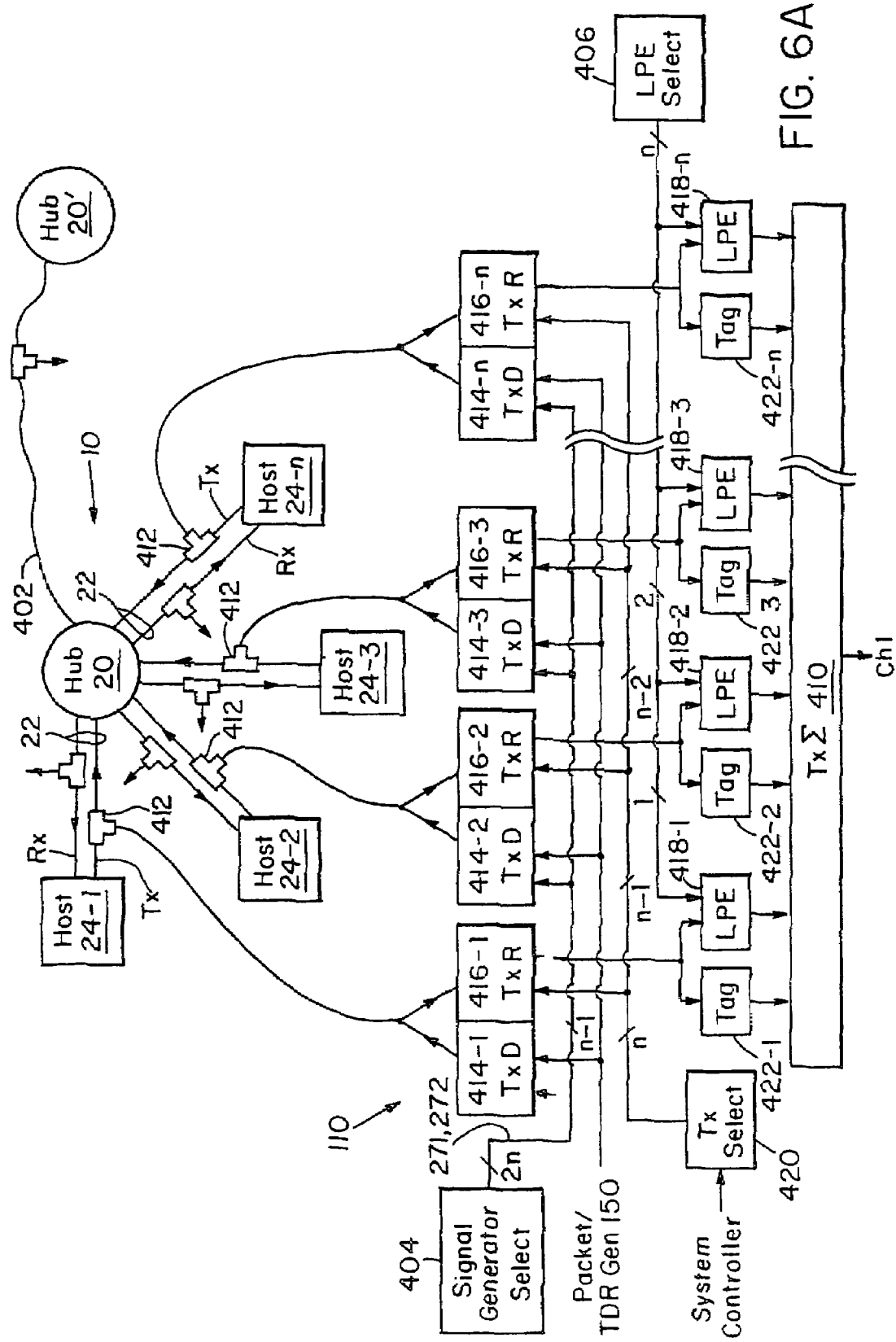

PACKET NETWORK MONITORING DEVICE

RELATED APPLICATIONS

This application claims priority from U.S. application Ser. No. 09/429,458 filed Oct. 28, 1999 which in turn is a Continuation of U.S. application Ser. No. 08/619,934, filed Mar. 18,1996, now abandoned and also claims priority to U.S. Provisional Application No. 60/010,719, filed Jan. 29, 1996, the entire teachings of which are incorporated herein by reference.

BACKGROUND OF THE INVENTION

The several common protocols for local area networks (LANs) include CSMA/CD (Carrier Sense Multiple Access with Collision Detection), token bus, and token ring. CSMA/CD is sometimes generically, but incorrectly, referred to as Ethernet, which is a product of the XEROX corporation using the protocol. I.E.E.E. has promulgated standards for these protocols, collectively known as IEEE 802, or also known as ISO 8802. IEEE 802.3 covers one-persistent CSMA/CD LAN; IEEE 802.4 and 802.5 cover token ring and token bus, respectively. These standards differ at the physical layer but are compatible at the data link layer in the seven layer OSI (Open Systems Interconnection) reference model.

CSMA/CD, token bus, and token ring are similar in the sense that they are all packet or frame based systems in which inter-node communications are broadcast over a shared transmission medium. In CSMA/CD, a node wishing to transmit over the network cabling listens to ensure that the network is idle, i.e., no other node is currently transmitting. When the network is idle, the node may begin transmission. Due to the physical extent of the cable, however, the simultaneous transmission of two or more nodes may occur. This gives rise to what is termed a collision. To compensate for this eventuality, each node also listens while it transmits. In some cases, the average voltage during the transmission will be different if a collision is occurring on the network. In other cases, a jamming signal will be generated by a network hub unit. Each node should terminate their respective transmissions during a collision and generate a jamming signal for a predetermined period. The nodes then individually wait for a random time interval before seeking to retransmit.

Token bus and ring architectures mediate access to the network cabling by passing an abstraction known as a token between nodes. A node must wait until it receives the token before it may transmit. If the node receives the token but does not wish to transmit or once it has finished its transmission, it simply passes the token to the next node, by signaling that node. Under this system, collisions should never occur. Thus, there is no requirement that the nodes listen during their transmissions as required by CSMA/CD.

Different protocols can be used in networks that have larger physical extent such as metropolitan area networks (MANs) and wide area networks (WANs). MAN protocols tend to be similar to the LAN protocols. WANs typically have comparatively low data rates. Also, lower reliability increases the need for more error checking. WAN protocols are selected to compensate for these differences.

Other technologies are also emerging. Asynchronous transfer mode, more commonly known as ATM, is specially designed for inter-network communications. It relies on fixed sized packets which makes the protocol suboptimal for most, but compatible with virtually all, applications, but this compromise increases the speed at which the packets can be routed. Optical fiber based systems are becoming more common such as the fiber distributed data interface (FDDI).

In each protocol, the nodes must comply with the relevant rules that dictate the timing of transmissions to fairly allocate access to the network's transmission bandwidth. Proper operation also dictates the format for the transmitted data. Packets must usually include a preamble to synchronize data decoding, comply with an error detection/correction scheme, and meet requirements for maximum and minimum lengths. There are a few techniques or devices that enable a network administrator to detect the violation of these rules, enabling diagnosis and location of the problems in the networks.

Protocol analyzers and remote monitoring (RMon) probes are commercially available devices that decode properly formatted digital transmissions on LANs, or similar networks. The devices function as passive network nodes that acquire packets and detect the cable voltages that are indicative of collisions. The origin, destination, and number of packets can be determined by reference to the packet's headers and bandwidth utilization statistics accumulated for analysis. The number and frequency of collisions can also be monitored.

FIG. 1 illustrates the architecture for the network interface portion 1410 of a protocol analyzer or RMon probe, which incidently is similar to any other network interface chip for a node in a CSMA/CD-type network. The interface comprises a phase-locked loop 1420 that uses each packet's preamble to synchronize to the source node. A decoder 1430 then extracts the destination address DA, source address SA, and data from the packet and performs error checking in response to a cyclic redundancy check CRC data contained in the frame check sequence (FCS) to ensure the packet 1440 is valid. On the assumption that it is, the decoder 1430 sends out only the destination address DA, source address SA, and data on the output line 1450. Simultaneously, a d.c. voltage threshold detector 1460 monitors the average voltage on the input line. In the example of 10Base(2) and (5), it will indicate a collision if the magnitude of the input voltage is more negative than −1.6 Volts. This occurs because the simultaneous transmission from two or more sources are additive on the network cable. When a collision is detected, the threshold detector generates the signal on a collision sense line 1470 and also disables the decoder 1430.

Two packets 1440 and a noise signal 1480 represent successive inputs to the network interface 1410. The analyzer can only interpret properly formatted packets, however. Noise 1480 is not detectable by the device. Moreover, if the noise exceeds the −1.6 Volt threshold of the detector 1460, the network interface 1410 may actually indicate the presence of a collision, but the source will not have been from typical network traffic.

In many cases, the protocol analyzers or RMon probes will not properly capture even valid packets on the network. If the gap between packets is less than 9.6 microseconds known as the inter-frame gap (IFG), the chip will usually miss the second in-time packet. Further, transmissions experiencing excessive attenuation or originating from a bad transmitter can result in collisions that are below the collision threshold. As a result, the analyzer will still attempt to decode the transmissions since the decoder will not be disabled. These devices can also saturate when a series of packet transmissions occur in quick succession.

Some of the shortcomings in the protocol analyzer and RMon probes are compensated by techniques that enable the analog analysis of the network transmission media. The most common one is called time domain reflectometry (TDR). According to this technique, a pulse of a known shape is injected into the cabling of the network. As the pulse propagates down the cable and hits electrical "obstacles," or changes in the cable's characteristic impedance, an echo is generated that travels back to the point of injection. The existence of the echo can indicate cable breaks, frayed cables, bad taps, loose connections or poorly matched terminations. The time interval between the initial transmission of the pulse and the receipt of the echo is a function of a distance to the source of the echo. In fact, by carefully timing this interval, the source of the echo can be located with surprising accuracy.

TDR analysis is typically used by installers to ensure that the newly laid wiring does not have any gross faults. The TDR signal is injected into the wiring while the network is non-operational to validate the transmission media. If a network is already installed, the network is first turned off so that TDR analysis can be performed. In a star topology network, the manager will typically check each link between the hub and host, marking any suspect wires. In bus topologies, the TDR signal is generated on the main trunk. In either case, reflections indicate breaks or defects in the network cables.

SUMMARY OF THE INVENTION

The shortcomings in the protocol analyzers and RMon probes surround the fact that they operate on the assumption that the physical layer, hardware and media, are operational. They attempt to decode the voltages transitions on the network cabling as data and sense collisions based upon the voltages relative to some preset thresholds, as in any other network card.

The operation of the analyzers impacts the available information, and thus limits their ability to accurately diagnose many of the problems that may afflict the network. Network cards, usually in nodes such as workstations or personal computers, may have been improperly manufactured, begin to degrade or become damaged. For example, one of the nodes on a network could have a defective driver in its output stage that transiently prevents it from driving the network cabling with sufficient power. The protocol analyzer or RMon probe would attempt to decode the packets from this node. If its phase-locked loop, however, can not lock on to the transmission, the analyzer will not recognize the attempt at transmission. If the analyzer can lock but the packet is invalid, the analyzer may label the packet as containing an error checking problem but will otherwise simply discard the packet without further analysis. Thus, the analyzer would provide no direct indication of the problems.

A packet can be undecodable for a number of other reasons such as improper formatting at the transmitter, failure to detect a collision or a defect in the cabling, to list a few possibilities. Interference is another problem. Elevators and fluorescent lights are common sources of network noise. This can corrupt otherwise valid packets or cause network devices to interpret the noise as communications or collisions. Moreover, 60 Hertz power frequencies can leak on the cabling, which can also confuse the decision structures in the network cards. Crosstalk with other communications networks can also occur. These problems are invisible to the analyzers.

Depending upon the particularities of the problems, the effect on the network can be nonexistent to catastrophic. The cards may simply generate bad packets or noise, which will be unrecognizable by the rest of the network but consume bandwidth. The performance impact can be high. A 1% loss of packets can lead to an 80% loss in bandwidth in some situations since the source node will attempt to retransmit until an "acknowledge" is received. Network cards have also been know to "jabber," or continuously transmit. This will cripple the network by blocking other nodes from transmitting.

TDR techniques can provide some information concerning cabling problems. However, TDR typically can only be used when the network is not operating. An isolated TDR pulse on the network can cause the nodes to behave unpredictably. This limits its usefulness to testing cabling after initial installation but before operation.

In light of these problems, the present invention is directed to a network diagnostic device that samples the voltages on the cabling of the network by analog-to-digital (A/D) conversion, but preferably does so at a higher rate and with greater resolution then is required to minimally detect digital transitions on the cabling. This A/D sampling provides information on the analog characteristics of digital and noise signals on the network. As a result, the reasons why a particular packet may be illegal, either because of a sub-threshold voltage transition or transient noise, for example, can be determined. Also, the nature of any network noise, crosstalk or interference can be identified and distinguished from legal and illegal transmissions. Further, node transmitters that cause improperly timed transmissions or fail to correctly detect or respond to collisions can be located. Defective cabling can also be identified. In short, the present invention provides the network manager or technician with a greater spectrum of information than would be available through typical digital decoding or TDR techniques. Even proactive maintenance is possible, allowing the network manager to predict rather than react to a failure mode.

In general, according to one aspect, the invention features a network analysis device for a digital data network. The device comprises a digitizer which digitally samples analog characteristics of signal events on the network and a system processor which downloads data of the sampled signal events from the digitizer, and which analyzes the signal events.

In specific embodiments, the system processor classifies the signal events as network communications or noise based upon parametric analysis of each event. The processor calculates certain parameters related to the voltage and frequency characteristics of the event and compares the parameters to ranges that are characteristic of different event classifications. The analysis can also include determining whether network communications are within frequency and voltage specifications for the network. The communications can also be Manchester and packet decoded by the system processor based upon the data.

In other specific embodiments, the network analysis device comprises an attachment unit for connecting the digitizer to the network. Typically, the unit comprises receivers which detect signals on the network and drivers which generate signals on the network. When the network has star topology, the unit comprises plural receivers which detect signals transmitted over separate links of the network and a summing circuit which combines the signals from each of the links on a channel of the digitizer. This summing, however, usually requires that asynchronous events, such as link pulses, on the links be eliminated. Thus, the unit also preferably comprises a link pulse elimination circuit which eliminates link pulses from the combined signal received by the digitizer.

The attachment unit may have other features. A selector circuit can be provided which individually enable the receivers to provide the detected signals to the summing circuit. Tagging circuits are also useful to generate a signal that identifies the link from which a sampled signal event originated for the system processor. The tagging signal can be combined with the signal events prior to the sampling by the digitizer or stored in a buffer and correlated to the sampled signal events by the system processor.

The invention is also capable of performing TDR analysis on a functioning network. This is accomplished by placing a TDR signal on the network, surrounded by a pseudo-packet transmission. The pseudo-packet can be configured to have a source and destination address of a diagnostic packet and thus be transparent so that the network nodes to ignore the transmission.

Accordingly in other embodiments, the network analysis device further comprises a signal generator which generates a predetermined signal for transmission over the network. The digitizer is then configured to sample the response of the network to the predetermined signal. System processor determines the signal transmission characteristics of the network from the response of the network to the predetermined signal. Preferably, the signal generator generates a packet-like transmission surrounding a voltage edge and the system processor extracts the response of the network to the edge. The packet-like transmission ensures that other network devices will not react to the signal.

In general, according to another aspect, the invention can also be characterized in the context of a method for monitoring the operation of a network. This method comprises digitally sampling analog characteristics of signal events on the network with a digitizer. The data arrays of the signal events are then downloaded to a system processor, which analyzes the data arrays to identify the signal events. The processor is then able to determine physical level characteristics of the network based upon the analysis.

In specific embodiments, the processor implements an event finder by comparing successive samples from the data arrays to thresholds and declaring the beginnings of events if the thresholds are satisfied. The ends of events are declared when the thresholds are no longer satisfied. The processor then records start times and stop times for the signal events. Once found, parameters are calculated for the signal events from the data arrays including frequency and voltage characteristics, and the event are classified as transmissions from other network devices or interference by comparing the parameters to parameter ranges for event classifications. Collision are also determined along with start and stop times for colliders. This analysis allows the processor to locate network devices that improperly react to collisions with other network devices or are otherwise improperly operating.

In general, according to this other aspect, the invention features a method for performing time domain reflectometry on an operational network. The method comprises generating a packet-like transmission on the network and embedding a TDR signal in the packet-like transmission. The response of the network to the TDR signal is then detected and analyzed to determine the signal transmission characteristics of the network.

In specific embodiments, the packet-like transmission has source and destination addresses that are indicative of a broadcast diagnostic packet. The TDR signal is then embedded in a data payload portion of this packet. This TDR signal is preferably a step function that has a very fast rise time.

In still other aspects, the invention concerns a method for Manchester decoding a digitally sampled network transmission. The process includes first comparing digital samples of the network transmission to a threshold and locating transitions in which successive digital samples change values relative to the threshold. The time periods between successive transitions are compared to a minimum bit period, which is preferably derived from a measure frequency of the transmission. Only transitions that are greater than the minimum period from a prior transition are interpreted as transmitted data.

In specific embodiments, the processor implements an event finder by comparing successive samples from the data arrays to thresholds and declaring the beginnings of events if the thresholds are satisfied. The ends of events are declared when the thresholds are no longer satisfied. The processor then records start times and stop times for the signal events. Once found, parameters are calculated for the signal events from the data arrays including frequency and voltage characteristics, and the event are classified as transmissions from other network devices or interference by comparing the parameters to parameter ranges for event classifications. Collision are also determined along with start and stop times for colliders. This analysis allows the processor to locate network devices that improperly react to collisions with other network devices or are otherwise improperly operating.

The analog characteristics include parameter such as: Midpoint: min, max, mean, quantity; Preamble Frequency: min, max, mean, sdev; Event High Frequency: min, max, mean, sdev; Event Low Frequency: min, max, mean, sdev; Maximum Voltage Distribution: min, max, mean, sdev; Minimum Voltage Distribution: min, max, mean, sdev; Peak to Peak Distribution: min, max, mean, sdev; Rise Time Mean: min, max, mean, sdev; Fall Time Mean: min, max, mean, sdev; Overshoot: min, max, mean, sdev; Undershoot: min, max, mean, sdev; First Bit peak-to-peak Voltage; First Bit Min Voltage; First Bit Max Voltage; First Bit Width Voltage; First Bit Rise Time; First Bit Fall Time; Jitter: min, max, mean, sdev.

In another aspect, the invention also concerns a method for identifying sources of transmissions on a network. This is referred to signature matching. The process involves calculating a plurality of analog parameters for transmissions from known sources. The parameters are also calculated for a transmission from an unknown source. The unknown source can then be identified based upon the degree to which the parameters match parameters from the known sources.

In anther aspect, the invention also concerns a method for identifying sources of transmissions on a network. This is referred to signature matching. The process involves calculating a plurality of parameters for transmissions from known sources. The parameters are also calculated for a transmission from an unknown source. The unknown source can then be identified based upon the degree to which the parameters match parameters from the known sources. Examples of the parameters include any combination of the following: Midpoint: min, max, mean, quantity; Preamble Frequency: min, max, mean, sdev; Event High Frequency: min, max, mean, sdev; Event Low Frequency: min, max, mean, sdev; Maximum Voltage Distribution: min, max, mean, sdev; Minimum Voltage Distribution: min, max, mean, sdev; Peak to Peak Distribution: min, max, mean, sdev; Rise Time Mean: min, max, mean, sdev; Fall Time Mean: min, max, mean, sdev; Overshoot: min, max, mean, sdev; Undershoot: min, max, mean, sdev; First Bit Max Voltage; First Bit Width Voltage; First Bit Rise Time; First Bit Fall Time; Jitter: min, max, mean, sdev.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a imitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 3A and 3B are a timing diagrams showing a hybrid packet/TDR transmission for performing TDR analysis on an idle network such as 10Base(2)(5) and 10Base(T), respectively;

FIG. 5 is a schematic block diagram of an attachment unit for a 10Base(2),(5) or similar bus architecture network;

FIG. 6A is a schematic block diagram showing the host transmit Tx side of an inventive attachment unit for a 10Base(T) local area network;

DETAILED DESCRIPTION OF THE PREFERRED EMBODIMENTS

1. Hardware

Figure 1:
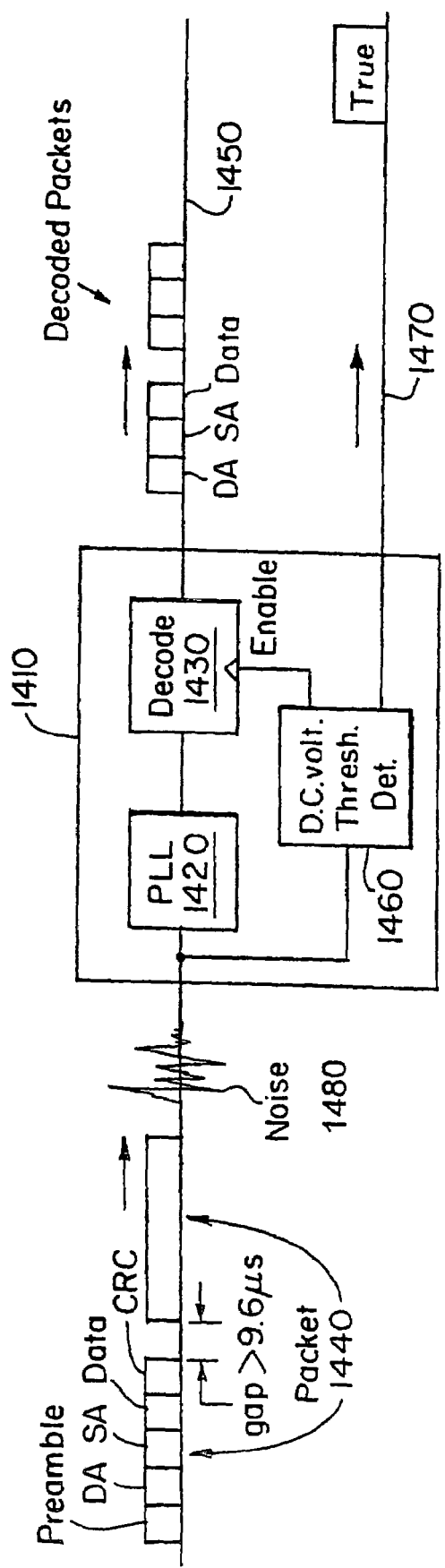
FIG. 1 is a schematic block and timing diagram showing the internal architecture of a prior art protocol analyzer or RMon probe and the response to exemplary packets and noise.
Figure 2:
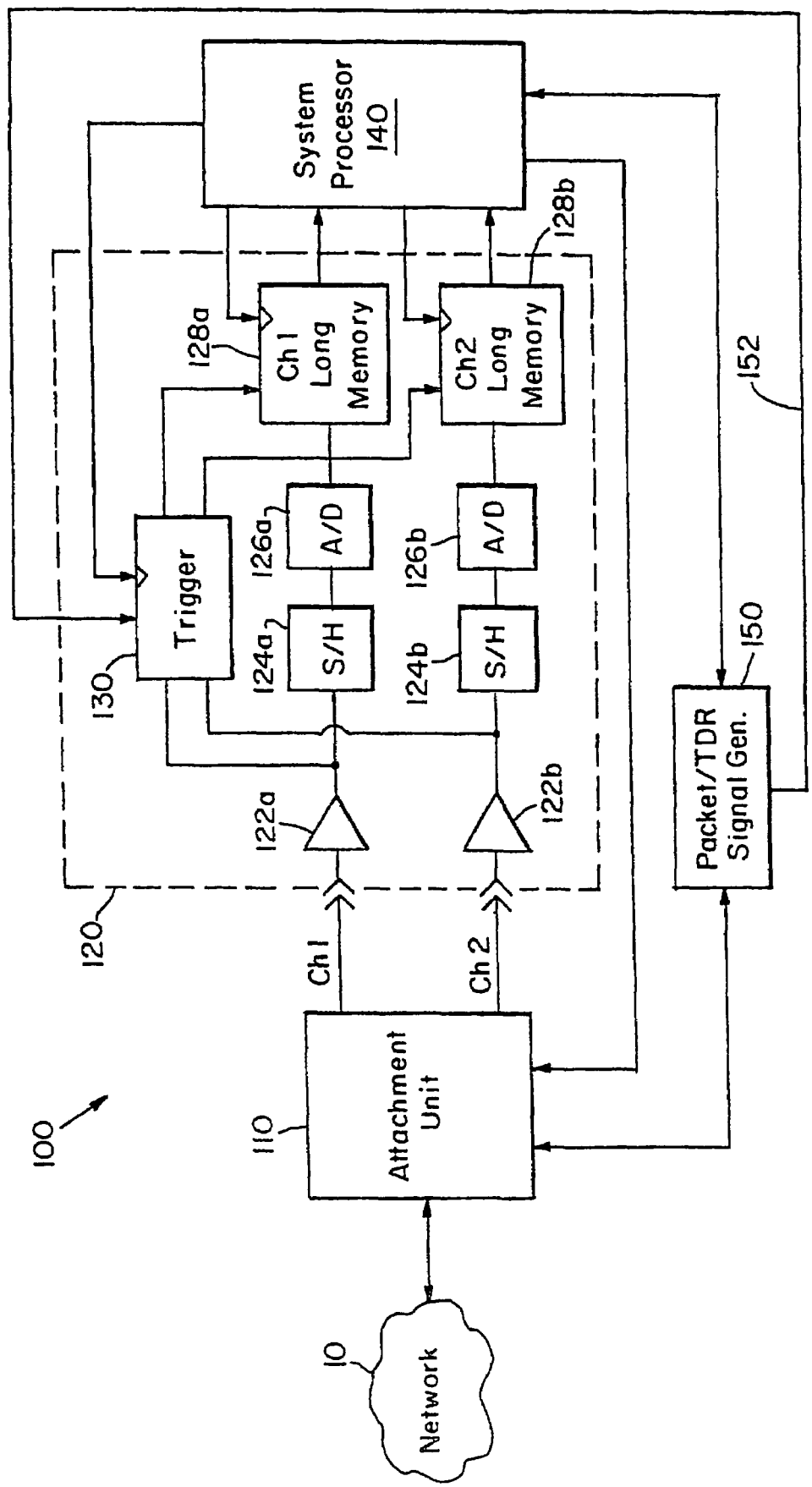
FIG. 2 is a block diagram showing the principle components of the network diagnostic device of the present invention.

FIG. 2 illustrates the principle hardware components of the network diagnostic device 100 of the present invention and an exemplary, schematically depicted, network 10.

An attachment unit 110 physically connects the device 100 to the network 10. The unit's design is dependent on the type of cabling and the frequency of transmission for the network 10. Different forms of cabling; twisted pair, coaxial cable or fiber optics, for example; and different topologies; such as bus, ring, or star; used in various networks dictate the specifics of the attachment unit used.

The following description details the implementation of the invention for 10Base(2), (5), and (T)-type CSMA/CD networks. 10Base(2) and (5) are 10 megabit per second (MBPS) networks using different gauges of coaxial cable (2 and 5) in a bus topology. 10Base(T) also operates at 10 MBPS but uses twisted-pair cabling in a star topology. Those skilled in the art will recognize, however, that the underlying principles of the invention are equally applicable to CSMA/CD networks generally such as faster 100 MBPS networks, e.g., 100 Base (T), and also less related architectures, such as token ring and token bus networks, wide area networks (WANs), fiber distributed data interface (FDDI) based networks, and asynchronous transfer mode (ATM) networks.

The attachment unit 110 provides a two-channel input to a digitizer 120 in the particular embodiment illustrated. Preferably, the digitizer is based upon a LeCroy Corporation digital oscilloscope card, Part No. 9350AL, with long memory capability. In any event, for adequate analog resolution, the digitizer should have at least a 500 MHZ sampling frequency and a long memory capacity of at least one megabyte, preferably 2 to 4 megabytes for 10 MBPS networks. This capacity enables events of approximately 2 milliseconds (msec) and longer to be captured. The longest legal packet on the network should last approximately 1.2 msec in duration, or about 12,000 bits at a period of 0.1 microseconds per bit. Thus, the sampling time of 2 msec is almost twice as long as the longest packet making these capabilities sufficient to capture and analyze an entire transmission from a network node including the timing between events and multiple transmissions. Analysis of 100 MBPS networks suggests the need for correspondingly faster sampling frequencies and longer memory capacities.

The digitizer 120 is usually a two channel device, although the principles of the invention can be adapted to single or multi-channel devices. The digitizer 120 comprises a buffering amplifier 122a, 122b on each of the two channels Ch1, Ch2. Two sample-and-hold circuits 124a, 124b downstream of each amplifier freezes the detected voltage in each channel for digitizing by two analog-to-digital converters 126a, 126b. The digital outputs of the converters are written into two long memories 128a, 128b, one assigned to each channel Ch1, Ch2. The memories 128a, 128b function as first-in, first-out (FIFO) buffers that continuously receive and store the output from the converters 126a, 126b until a trigger signal is received.

A trigger device 130 generates the trigger signal usually in response to some monopolar or bipolar trigger condition that is applied to the signal output of the buffering amplifiers 122a, 122b. Bipolar trigger conditions are preferred for 10Base(T) networks. Preferably, the trigger signal is generated in response to the detected voltage either exceeding 300 mV or becoming more negative than −300 mV. Alternatively, the trigger condition can be based upon the electrical properties such as frequency or rise-time exceeding some defined range.

Although the sources for the trigger device 130 are programmable so that a trigger signal could be generated for both memories based upon the voltages on only one channel, typically it triggers each channel based upon the voltages on that channel. The generation of the trigger signal causes the freezing of the contents of the two long memories 128a, 128b. Some fixed or variable delay, however, may be added on the trigger signal so that the first samples of the event stored in the memory are contemporaneous with the occurrence of the trigger condition. In other words, the delay ensures that the contents of the memories represent the sampled voltages from the network cabling only after the occurrence of the trigger condition.

The trigger device 130 is also be able to apply digital trigger conditions under software control. Many times, a network administrator may want to sample only packets with a specific source or destination address. Accordingly, the trigger device 130 can also function as a decoder that generates the trigger signal to the memories 128a, 128b in response to the digitally decoded transmissions over the network 10.

A system processor 140 is connected to read the arrays of data from the long memories 128a, 128b of the digitizer 120. In one implementation, it is a personal computer running the Microsoft NT (trademark) operating system. The system processor 140 performs signal processing, event finding, and event classification based upon parametric analysis of the data arrays and diagnoses problems with the network's physical layers based upon this analysis. The system processor 140 also provides the overall control of the LAN monitoring device 100. It controls the readout of the Ch1 and Ch2 long memories 128a, 128b, arms the hardware trigger 130, and also controls the configuration of the attachment unit 110.

Some finite time is required for the system processor 140 to perform the signal processing and event classification. In fact, in many cases it can take over one minute. Thus, not every event can be captured by the digitizer if the system processor performs the analysis in real time. Digitizer 120 would be triggered by some event, capture its data, download the data, and then be required to wait until the system processor 140 is ready to receive the next array of data. This can be overcome by other techniques. The speed of the processor 140 could be increased by including multiple, faster processors or a larger memory 128 could be used implemented.

A packet/TDR signal generator 150, also under the control of the system processor 140, is connected to the network 10 via the attachment unit 110. The signal generator 150 has much of the control logic that would be contained in a network card for the relevant network. It can determine when other nodes are transmitting, determine the presence of collisions, and assess when a packet transmission can be made in accordance with the network's protocol.

The signal generator 150 produces a hybrid TDR/packet transmission in order to allow the device 100 to perform TDR network analysis while the network 10 is operational. As described above, nodes can behave unpredictably if a lone TDR pulse is transmitted over an idle network. The nodes, however, will generally ignore a packet transmission as long as it is not addressed to the nodes. In fact, the signal generator is configured to generate a broadcast diagnostic packet. Packets with this source and destination address will be universally ignored by the network's nodes. Thus, when the TDR step function is generated where a data payload would typically be found, the step function will be transparent and the nodes should simply ignore the event, even though the transmission is a non-conforming packet.

FIG. 3A schematically shows the hybrid TDR/packet transmission 200 for 10Base(2)(5). In compliance with the network's protocol, the packet 200 has a standard length preamble 210. The source and destination addresses 220, 230 conform to a diagnostic broadcast packet. A data payload 240 is started, but then after some predetermined time, the voltage on the cabling is held at a quiescent level, i.e. 0 Volts in most networks, for time $t_1$. This period corresponds to the time that is required for a signal to traverse the entire network, usually between 1 and 6 microseconds. This delay allows any echoes to die out. Then, the edge 250 of the TDR pulse is generated, raising the voltage on the cabling to some selected level. As shown, this voltage is preferably close to the normal voltage swings experienced during data transmission, but a stronger signal-to-noise ratio can be obtained by using higher voltages. In any event, the voltage swing should not be so large as to create the risk of damage to any of the node's network cards. The new voltage level is then held long enough to allow the TDR edge to propagate throughout the network and any echoes to be received back by the digitizer at time $t_2$. At the expiration of this time, the voltage on the network is brought back to a quiescent state allowing the other nodes on the network to recognize the end of the transmission.

The digitizer 120 is used to detect the response of the network 10 to the TDR pulse. The trigger device 130 of the digitizer is armed in response an idle condition on the network 10 and triggered by the packet/TDR generator 150 on line 152 in response to the transmission of hybrid packet. The system processor then extracts any detectable echo from the sampled event. By analyzing the echo, the location of any cabling problems can be found.

FIG. 3B is a timing diagram showing the hybrid packet/TDR transmission for 10Base(T) media. Here, the voltages vary positively and negatively around 0 Volts. The approach can be applied, however, to other medias and protocols. The concept is to embed the TDR transition in a transmission that otherwise conforms to the typical network traffic. Preferably, the transmission is formatted as a broadcast-type transmission that will be ignored by the nodes, thus ensuring that the nodes will not react unpredictably.

Figure 4A:
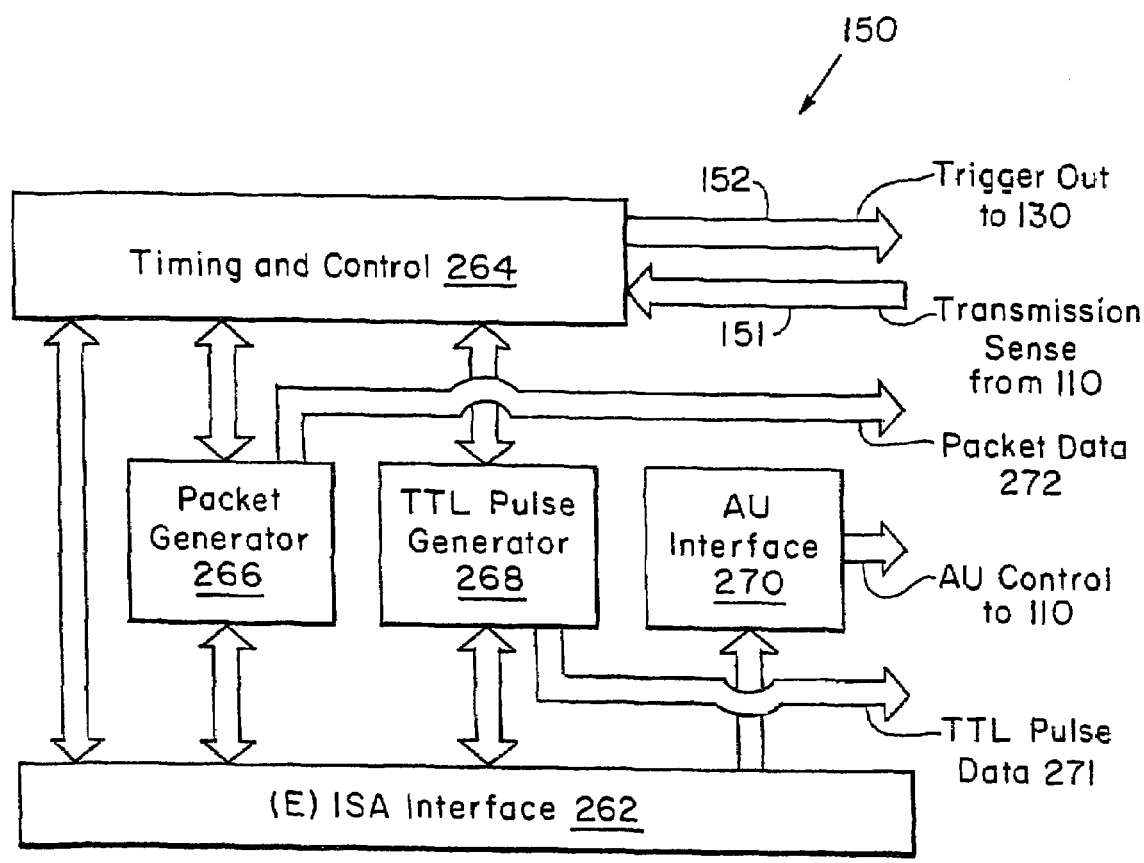
FIG. 4A is a block diagram showing the components of the packet/TDR generator of the present invention.

FIG. 4A is a block diagram showing the internal construction of the packet/TDR signal generator 150. In one embodiment, the signal generator is an IBM-PC ((E)ISA) compatible design which is connected to the bus of the system processor 140 via an interface 262. A timing and control module 264 receives a transmission sense line that connects to the network cabling via the attachment unit 110. The module also generates the trigger out signal to the trigger device 130 via line 152. The operation of a packet generator 266 and TTL pulse generator 268 are coordinated by the timing and control module 264. The packet generator 266 is programmable by the system processor 140 to generate any arbitrary packet on line 272. In the context of TDR analysis, however, it is typically programmed to generate the broadcast packet as described in connection with FIGS. 3A and 3B. The TTL pulse generator 268 generates the fast transition contained in the TDR edge on line 271.

During TDR analysis, the operation of the packet generator 266 and the pulse generator 268 are coordinated by the timing and control unit 264 to produce the packet shown in FIGS. 3A and 3B. The outputs are then separately passed to the attachment unit 110. Finally, an AU interface 274 provides control signals to the attachment unit 110 to coordinate the operation of the packet/TDR signal generator 150 and the attachment unit 110.

Figure 4B:
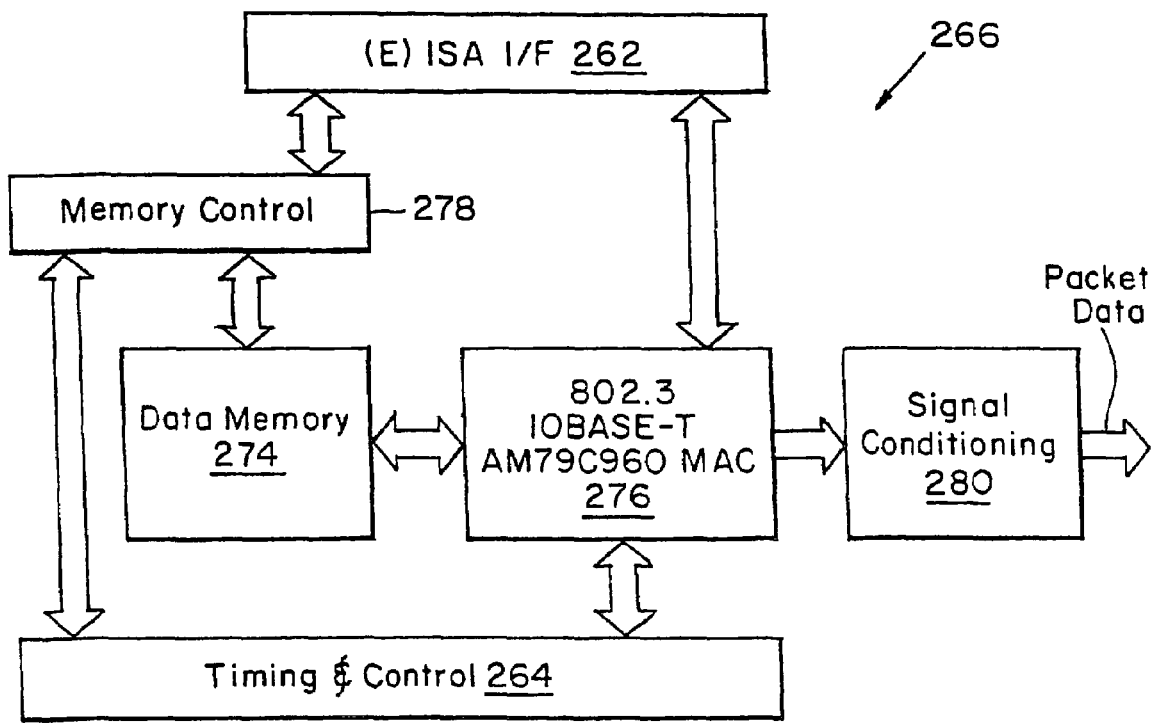
FIG. 4B is a block diagram showing the components of the packet generator of the present invention.

FIG. 4B is a block diagram showing the internal architecture of the packet generator 266. A data memory 274 stores any packet data downloaded from the system processor 140. In the particular example of a 10Base(T) compatible device, an 802.3 interface IC 276, such as an AM79C960, generates the Manchester encoded packet data which is transmitted over the network 10 via the attachment unit 110. In many situations, the interface IC 276 may have an on-board FIFO that eliminates the need for the separate data memory 274 and memory controller 278. The signal conditioner 280 is required to convert the interface IC output to the required voltage to drive the current amplifiers in the attachment unit 110.

Using a conventional interface IC as the packet generator 266 provides more functionality than is strictly required to generate the broadcast packet shell 200 surrounding the TDR edge 250. This allows the system controller 140 to probe the response of the network 10 with other types of transmissions. For example, I.P. ping or other packet generators could be developed to stress network for analog problems. Similarly, successive packets can be generated onto the network 10 to assess whether the devices on the network can compensate for this spacing. Many times, this spacing can be less than the 9.6 microsecond gap required by IEEE 803 for some transmitters that do not properly comply with the protocol. This process determines whether other network devices can compensate for these out of specification transmissions. In other situations, the packet generated by the packet generator can be out of specifications with regard to its transmission rate. Bit rates of higher than 10 MBPS can be generated on the 10Base(T) network to determine whether network devices can also compensate for this situation.

Figure 4C:
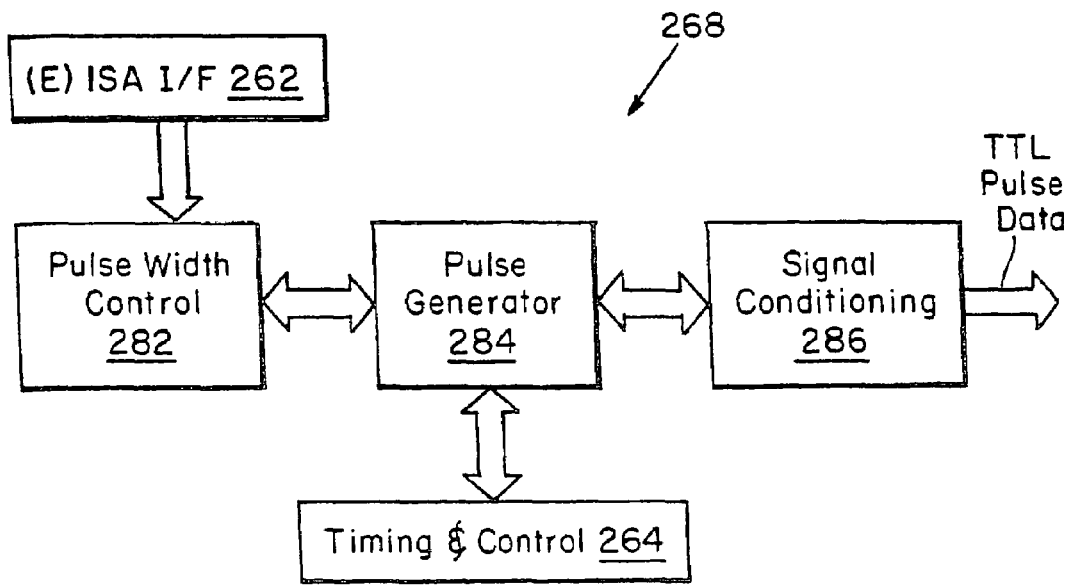
FIG. 4C is a block diagram showing the components of the TTL pulse generator of the present invention.

FIG. 4C is a block diagram showing the construction of the TTL pulse generator 268. A pulse width controller 282 controls the length of the TDR pulse, specifically $t_2$ in FIGS. 3A and 3B. The pulse generator 284 generates a voltage pulse under control of the timing control logic 264. By properly controlling the packet generator and the pulse generator, $t_1$ of FIGS. 3A and 3B can be controlled.

Figure 4D:
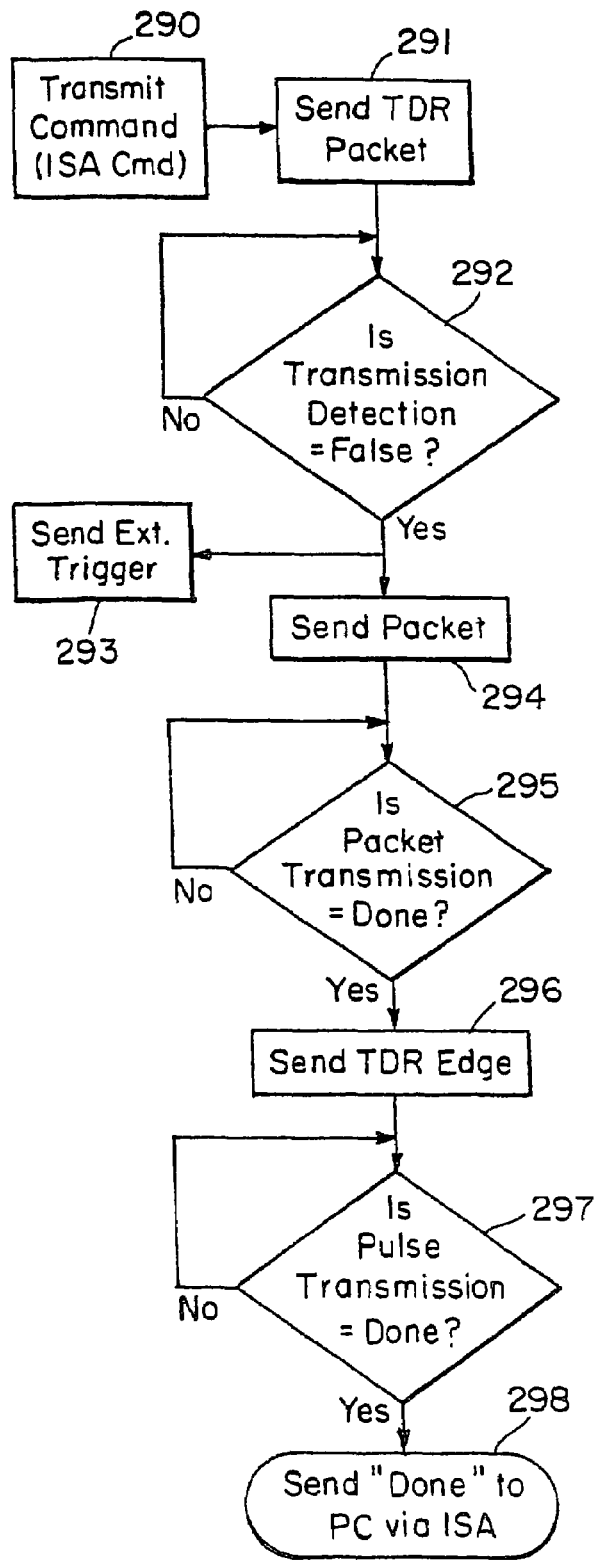
FIG. 4D is a state diagram illustrating the operation of the timing and control circuit of the packet/TDR generator of the present invention.

FIG. 4D is a state diagram for the timing and control module 264. The module is activated by a transmit command that is received via the ISA interface 262 in step 290. It then prepares to send the TDR packet in step 291. First, it waits until the network is idle in step 292. This occurs by monitoring for any activity on the transmission sense line 151. When there are no transmissions on the network cabling, the timing control module 264 simultaneously sends an external trigger to the trigger device 150 of the digitizer 120 in step 293 and signals the packet generator 266 to begin sending the packet 200 in step 294. The module then waits until the transmission packet is finished in step 295 when it sends the TDR edge 250 by signaling the TTL pulse generator 268 in step 296. It again waits for the conclusion and then signals the system controller 140 via the ISA interface 262 in steps 297 and 298.

FIG. 5 is a more-detailed block diagram of the attachment unit 110 for a 10Base(2) or 10Base(5) IEEE 802.3 network. These types of networks rely on a bus architecture in which a number of nodes 12 are connected by taps to the coaxial cable 14. The cable 14 has terminations 16 at either end to prevent signal reflection.

The attachment unit 110 comprises a differential driver 310 that receives the signal output of the packet/TDR signal generator 150 and couples this signal into to the network 10. The driver is paired with a receiver 320a connected to Ch1 of the digitizer 120. A second receiver 320b is connected to Ch2 of the digitizer.

The receivers 320a, 320b are preferably high impedance/high bandwidth differential amplifiers. The receiver 320a, which is paired with the driver 310, is connected directly across the coaxial conductors of the network cabling 14. The high input impedance of the receiver and its direct connection to the cabling ensure a low capacitance connection that will not affect the signal transmission characteristics of the cabling 14 and thus distort the analysis.

The second receiver 320b is connected to receive the signal input from the other end of the network cable 14. Typically, this end of the network is physically remote from the point of connection of the first receiver 320a. As a result, a linear amplifier 340 with a high input impedance is preferably directly connected to the far end of the network and then a return cable 350 of known length extends between the linear amplifier 340 and the second receiver 320b.

Signals propagate over the cable at a finite speed. In fact, a given signal will propagate a meter or less during the sampling period of the digitizer 120. These characteristics can be used to resolve the sources of the signals on the cable 14. The origin of the echoes or signals can be determined by comparing the time difference between the receipt of the signal on the respective digitizer channels Ch1 and Ch2 according to the following formula:

From the following constants:
(System cable propagation time)
(Return cable propagation time)
(System cable propagation velocity)
The following values are calculated:
1) (Total propagation time)=(System cable propagation time)+(Return cable propagation time)
2) (Delta time)=(Start time(Channel 1 event))−(Start time (Channel 2 event))
The event location is then determined relative to Ch1:
3) (Event location time)=(Total propagation time+delta time)/2
2) (Event location position)=(Event location time) (System cable propagation velocity)

The driver 310 receives both lines 271, 272 from the packetDR signal generator 150. The signals are delivered with the proper voltage and time wave forms. The driver 310 is voltage to current driving networks that drives the current out onto the network 10. Preferably, emitter-collector logic is used that has transition times of 100 picoseconds or less.

Figure 6B:
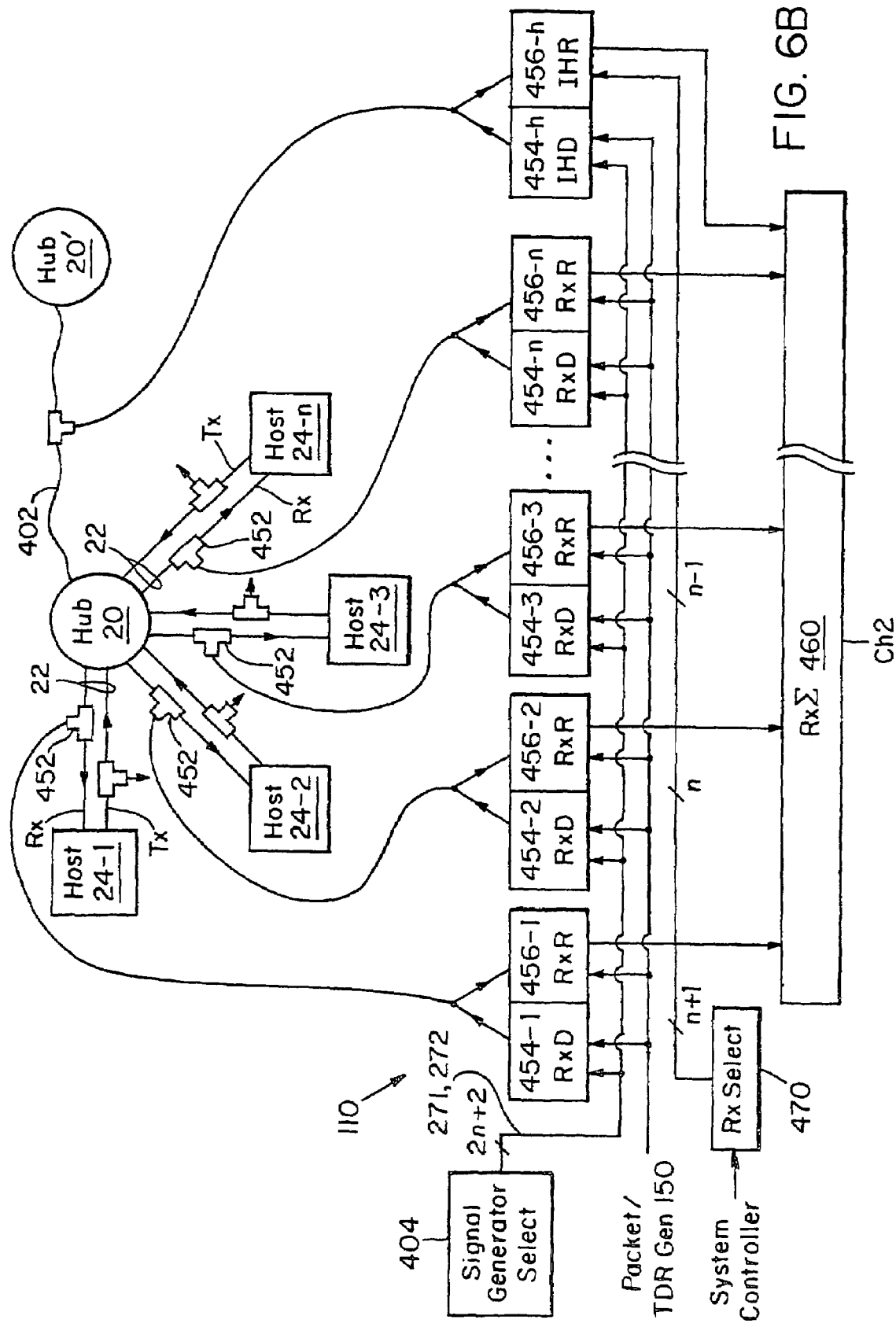
FIG. 6B is a schematic block diagram showing the host receive Rx side of the inventive attachment unit for the 10Base(T) local area network.

FIGS. 6A and 6B show the configuration of the attachment unit 110 for 10Base(T)-type networks for the host transmit Tx and host receive Rx lines, respectively. A 10Base(T) network uses a star topology. A hub 20 is located at the origin of several cable links 22 to separate host computers 24-1 to 24-n. Inter-hub transmissions are handled usually with a faster coaxial or optical fiber interface 402 to another hub 20'.

The separate links 22 between hub 20 and host 24 use twisted-pair cabling. And, the links are in a common collision domain. Basically, the hub 20 rebroadcasts signals it receives from one of the hosts over the host transmit Tx lines (hub Rx lines) to every one of the other hosts over the host receive lines Rx.

Figure 7:
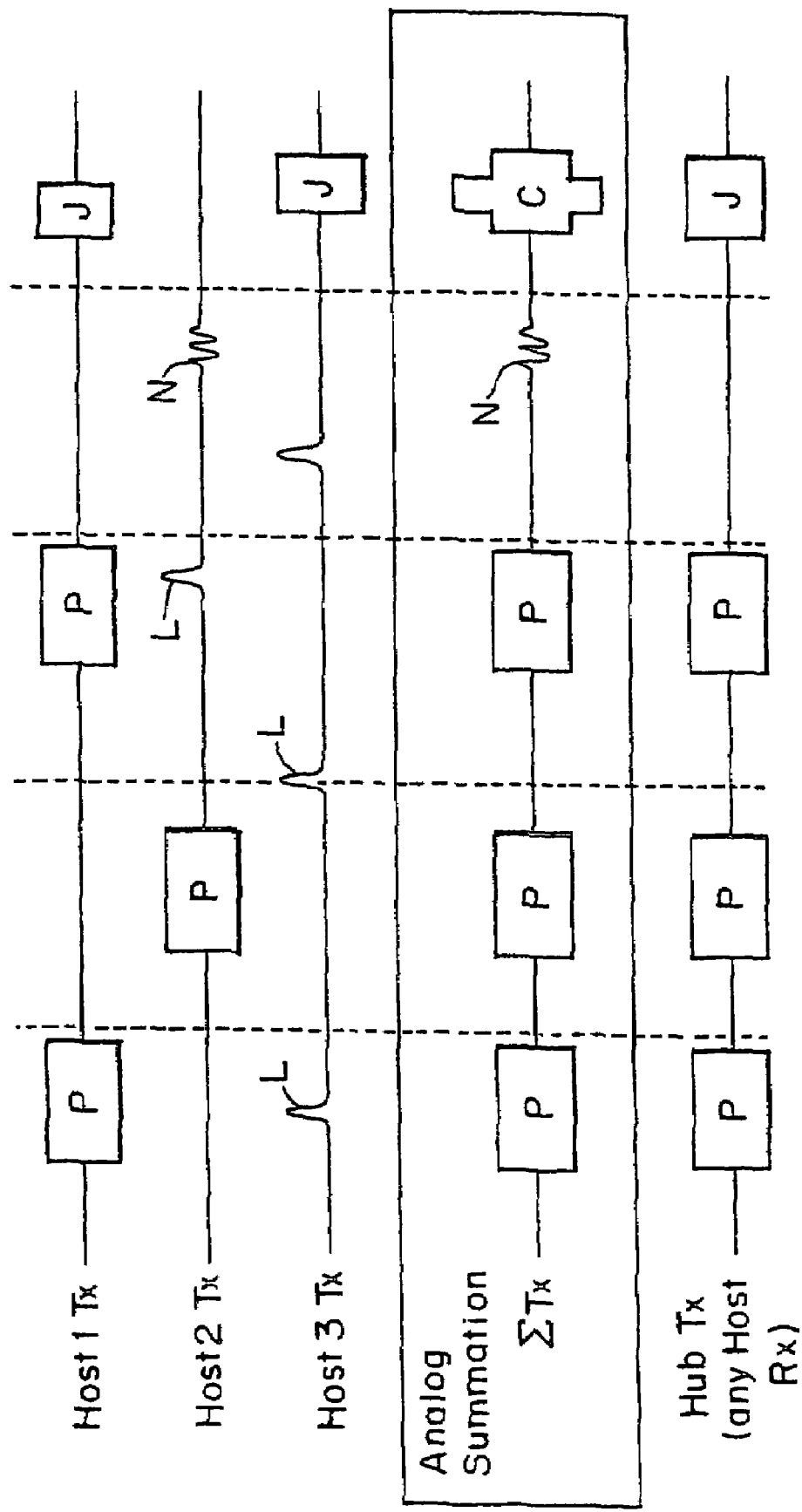
FIG. 7 is a tiring diagram showing exemplary traffic on host transmit Tx and receive Rx lines of the network links.

FIG. 7 is a timing diagram showing, among other features, the hub's retransmission role. Packets P comprising digital bits of data are transmitted over links 22 from hosts 1-3 on the Tx lines. Any of the Host Rx lines, the Hub Tx, carries the combination of these packets that appeared in the links 22.

FIG. 6A shows the host transmit side of the attachment unit 110 of this embodiment. The unit has a Tx summer 410 that combines all of the communications from hosts 24 to the hub 20 on Ch1 of the digitizer 120. In more detail, on every one of the host transmit Tx conductors of the links 22, a "T" connector 412 is spliced into the link 22. This provides a tap for sampling the voltages on the link conductors without interfering with communications between the hub 20 and hosts 24. Each of these T connectors 412 connects to a differential Tx driver 414-1 to 414-n and Tx receiver 416-1 to 416-n of the unit 110.

Each Tx differential driver 414-1 to 414-n separately receives the packet and TDR signals or other packet transmission from the packet/TDR signal generator 150 on lines 271, 272 to current drive the corresponding links. The differential drivers are individually selectable by the signal generator select circuit 404. The signal generator selector 404 has the capability of individually selecting the Tx drivers 414 to 414-n, or any combination of the drivers, to transmit the hybrid packets/TDR signal onto the corresponding Tx conductors of the links 22. Typically, only one of the Tx drivers will be selected, however, at one time. This prevents the hub 20 from declaring a collision and transmitting a jamming signal to the hosts 24.

A Tx select circuit 420 is provided to separately enable the Tx receivers 416 to 416-n. The Tx select circuit 420 is controlled by the system controller to individually enable any one of the Tx receivers or enable any combination of these receivers.

Returning to FIG. 7, since the Tx summer 410 generates the analog combination of the transmissions over each of the links for which the corresponding Tx receivers are enabled, the waveform from the Tx summer during a collision C is non-physical in the context of the network 10. As described previously, in 10Base(T), the packets never actually collide; the hub and hosts sense the collision and generate jamming signals J. The Tx summer 410, however, combines the two packet transmission and generates the collision waveform C.

Link pulses create a problem when the signals from the host Tx conductors are summed from more than one link 22. Star topologies are commonly designed to send a link pulse L from the hosts 24 and hub 20 if the link 22 has been silent for some predetermined time. This way, the hub 20 can ensure that the host is still operational, and the link is simply idle rather than dead. The pulses L, however, are asynchronously generated and do not comply with the network's common collision domain. They must, therefore, be removed before the signals from each link are summed together. Otherwise link pulse on the Host 2 Tx, for example, will interfere with the analysis of the packet transmission on Host 1 Tx.

Link pulse elimination circuits 418-1 to 418-n, in FIG. 6A, prevent this conflict by providing the capability to eliminate these signals but still allow packet transmissions and most noise or interference signals to pass to the digitizer. The link pulse elimination circuitry 418-1 to 418-n, however, can cause the device 100 to eliminate any events that are shorter than the link pulse in duration, which in some circumstances may not be acceptable. To overcome this problem, the Tx receivers can be selectively enabled for detection by the Tx select circuit 420. By enabling only one of the Tx receivers 416 to 416-n, conflicts between events that do not comply with the common collision domain are prevented. A link pulse elimination select circuit 406 is then used to control each of the link pulse elimination circuits 418-1 to 418-n by disabling the link pulse elimination function. This allows the digitizer to sample link pulse events or any other events that would otherwise be eliminated by the link pulse elimination circuits 418.

Tagging circuits 422-1 to 422-n also receive the sampled link signals from the Tx receivers 416-1 to 416-n. The tagging circuits 422-1 to 422-n generate a characteristic tag signal that identifies the origin of every signal that is sampled from the links. The tag signals are combined in the Tx summer 410 and digitized in by the digitizer. This allows the location of a transmission to be determined among the hosts of the network.

Figure 8A:
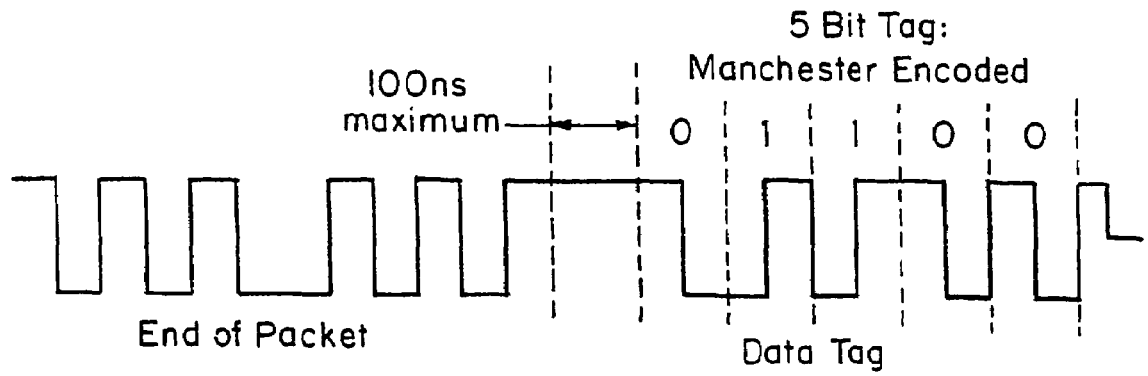
FIG. 8A shows a packet event and a 5-bit Manchester encoded tag produced by a first embodiment of the data tagging circuit.

FIG. 8A shows one implementation of the tag signal as a 5-bit Manchester encoded bit sequence. The tag signal follows the waveform event, here shown as a packet, by at least 100 ns to ensure that the event has actually terminated. The tag at the end of the waveform event, however, should not so long as to conflict with the sampling of other events on the network. Properly functioning nodes should wait at least 9.6 microseconds after the end of each packet before sending their own packet, and the tag is shorter than this period.

Figure 8B:
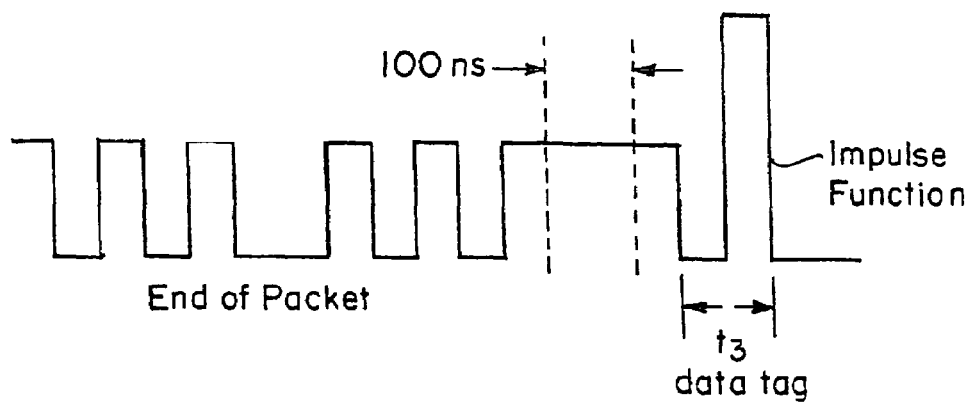
FIG. 8B shows a packet event and a level and period encoded tag produced by a second embodiment of the data tagging circuit.

FIG. 8B shows another implementation of the tag signal as a controlled level impulse function which is placed after the event. Since the digitizer encodes with 8-bit precision, a large number of unique level signals are available to encode the event's origin. Also, the tag encoder circuitry can be simplified to a voltage divider that operates in response to a reference voltage. This implementation has the advantage of shortening the tag signal to approximately one bit period. $t_3$ is limited to 100 nanoseconds maximum.

In a modification of this implementation, data can be encoded in both the voltage and pulse width providing two dimensions of modulation. The analog to digital converters 126 in the digitizer 120 can resolve 32 unique voltage levels, allowing some margin for noise. Four unique pulse durations $t_3$ could be also be used. This scheme would result in 128 unique data tags.

Figure 8C:
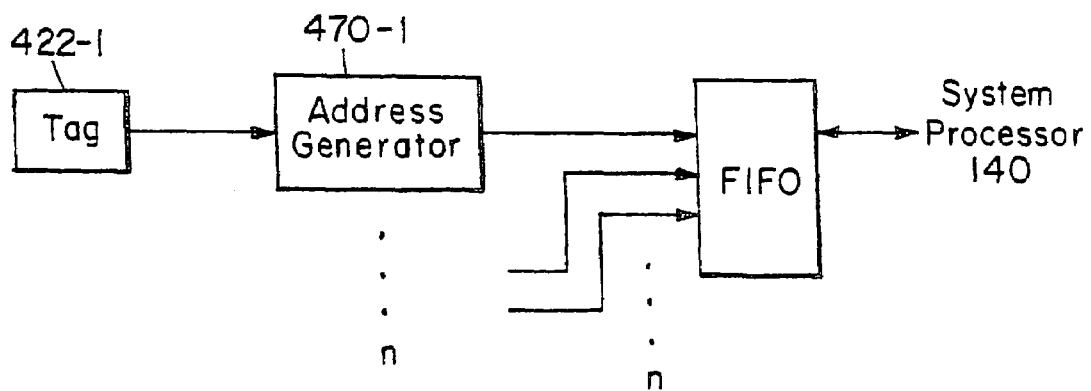
FIG. 8C shows a hardware data tagging circuit according to a third embodiment.

FIG. 8C is a block diagram showing a hardware implementation of the tag signal generator 422. In this implementation, the tag signal is not stored following the signal event in the digitizer 120. Instead, in response to detecting an event, the tag signal generator 422-1 signals a corresponding address generator 470-1 which transmits an address unique to the link on which the event was detected. This address is stored in a first-in first-out buffer (FIFO) 472 along with the unique addresses of events from any of the other links. The system processor 140 is then able to read out these addresses and correlate them to events captured in the digitizer 120.

Returning to FIG. 6A, when monitoring the Tx side of the network 10, the system controller 140 operates the link pulse enable select circuit 406, and the Tx select circuit 420 to operate in one of four modes. Most commonly, the Tx select circuit 420 enables every one of the Tx receivers 416-1 to 416-n. The link pulse enable select circuit 406 similarly enables each of the link pulse elimination circuits 418-1 to 418-2. Thus, Ch1 of the digitizer 120 receives the analog summation of all of the events on every one of the Tx conductors of the links 22 as shown in FIG. 7. Only those events that activate the link pulse elimination circuits are prevented from reaching the digitizer. This is the most common operating mode since it allows the network manager to capture any of the events occurring on the network 10.

Alternatively, every one of the Tx receivers 416-1 to 416-n could be again enabled to receive signals by the Tx selector circuit 420. The link pulse elimination select circuit 406, however, could disable each of the link pulse elimination circuits 418-1 to 418-n. This allows Ch1 of the digitizer 120 to receive and sample link pulse events and short events that would otherwise be eliminated by the link pulse elimination circuits 418. The operator must remember, however, that in this mode, it would be common for non-physical events to be detected on Ch1, which are the result of simultaneous occurrence of two link pulses on different links 22.

Finally, only a single Tx receiver 416 could be enabled to sample only events on a single Tx line of a single link 22. This mode has the advantage of ensuring that any detected events actually physically occurred on the enabled link; two separate events will never combine to form a non-physical signal in this case. Typically in this mode, the link pulse elimination circuits 418 will be disabled since there is no likelihood of conflict between the links. Sometimes, however, when it is known that the host 24 is properly signaling the hub with link pulses, the operator may want to eliminate the link pulses to capture other types of events.

The system described thus far only has connections for receiving transmissions from the hosts 24 to the hub 20. FIG. 6B shows attachment unit connections to the host receive lines Rx of the network. As on the Tx side, T connectors 452 are spliced into the network links 22 to connect each Rx driver 454-1 to 454-n and Rx receiver 456-1 to 456-n. The output of the Rx receivers 456-1 to 456-n is directly received by an Rx summer 460 which provides the input to Ch2 of the digitizer 120.

An Rx selector circuit 470 is provided to selectively enable the Rx receivers 456-1 to 456-n individually or any combination of the receivers. As on the Tx side, this allows any combination of the signals from the Rx lines to be combined on Ch 2 of the digitizer.

The signal generator select 404 also controls each of the Rx drivers 454-1 to 454-n. Thus, the signal from the packet/TDR generator 150 can be selectively provided on any of the Rx conductors of the links 22 by enabling the corresponding Rx driver 454.

The differences between the Rx and Tx sides of the attachment unit 110 derive for differences in the signals on the Rx and Tx lines. When the hub 20 receives a transmission from a host 24 over the link's Tx lines, the hub forwards the transmission to every other host over the receive Rx lines for those links, as shown in FIG. 7. Therefore, the host receive lines generally cannot be simply summed since the same signal from each of the links would interfere with each other. An Rx enable circuit 470 provides separate enable signals to each of the Rx receivers. Typically, only one of the Rx receivers will ever be enabled at one time in contrast to the Tx side, which usually sums the signals from all the links.

The attachment unit 110 also has the capability to sample inter-hub or behind the hub transmissions. This functionality is provided by connecting an inter-hub driver 454-h and inter-hub receiver 456-h to inter-hub link 402 between hubs 20 and 20'. The signal generator select circuit 404 has a control over the driver so that TDR analysis can additionally be performed on link 402. Many times inter-hub transmissions will utilize different protocols to which the packet/TDR generator 150 must be compatible.

The inter-hub receiver 456-h is selectable by the Rx select circuit so that when it is enabled, inter-hub transmissions are provided on Ch 2 of the digitizer. This configuration allows the network operator to determine whether the hub is properly forwarding packets addressed to hosts serviced by hub 20'. The packet will be first detected as a host-to-hub transmission by the Tx side of the attachment unit 110. Then by enabling only inter-hub receiver 456-h, the packet is detected as it is transmitted to hub 20'.

Figure 9:
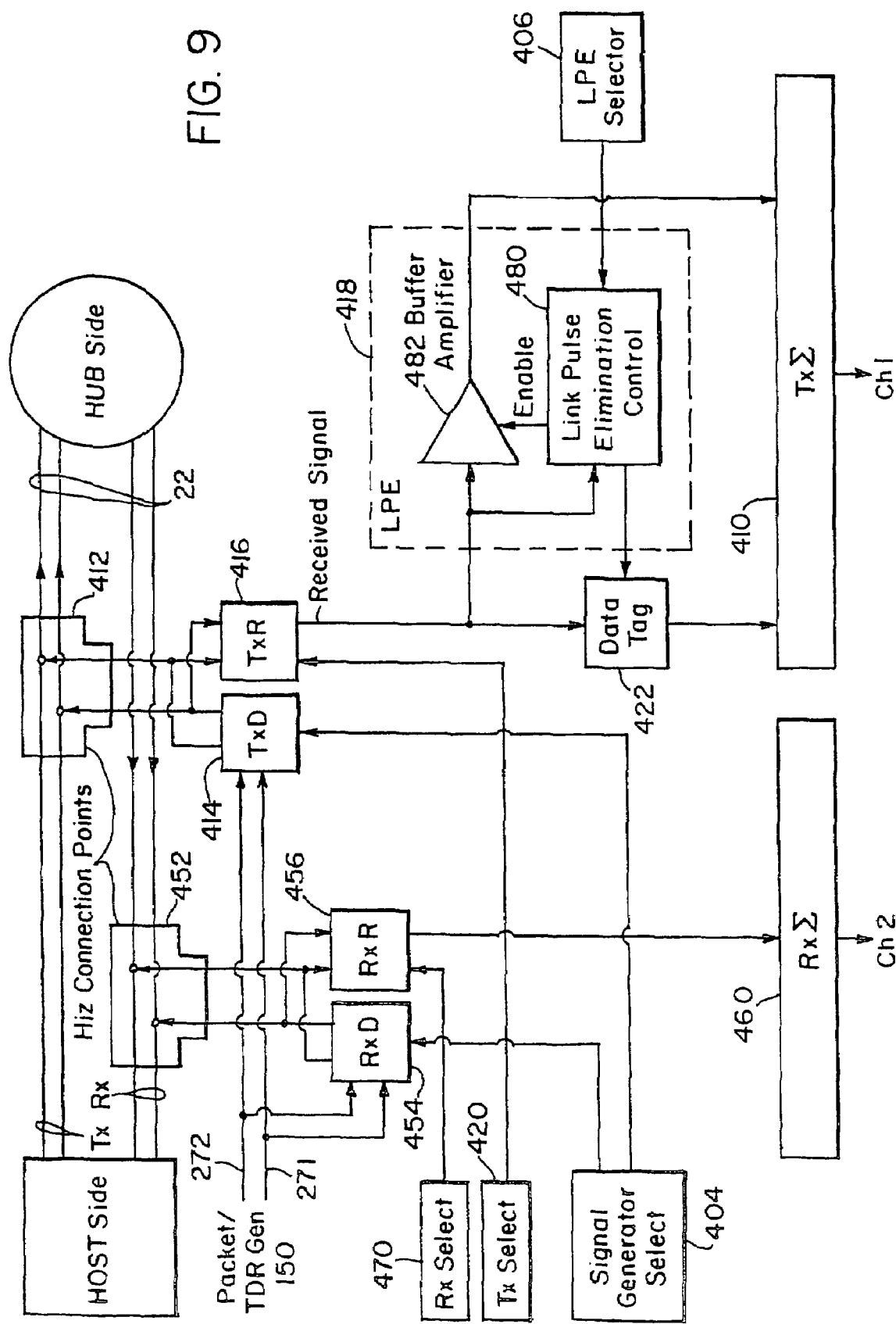
FIG. 9 is a detailed circuit diagram showing the attachment unit for one link of the network.

FIG. 9 is more detailed circuit diagram for the attachment unit 110 on one link 22 of the 10Base(T) network. As described previously, two T connectors 412, 452 are spliced into the host transmit Tx and host receive Rx twisted pair wires. These provide connection for the Tx driver/receiver pair 414/416 and the Rx driver/receiver pair 454, 456.

The internal structure of the link pulse elimination circuit 418 is also shown. A link pulse elimination control circuit 480 monitors the received signal from the Tx receiver 416 for a link pulse. When no pulse is detected, it generates an enable signal to a buffer amplifier 482 that connects the receiver to the Tx summner 410. If a link pulse is detected, however, the control circuit 480 disables the buffer amplifier 482, thus blocking the signal from being combined with the responses from other links. The link pulse elimination selector 406 gates enable signal from the control circuit 480 so that the link pulse elimination function can be disabled.

Figure 10A:
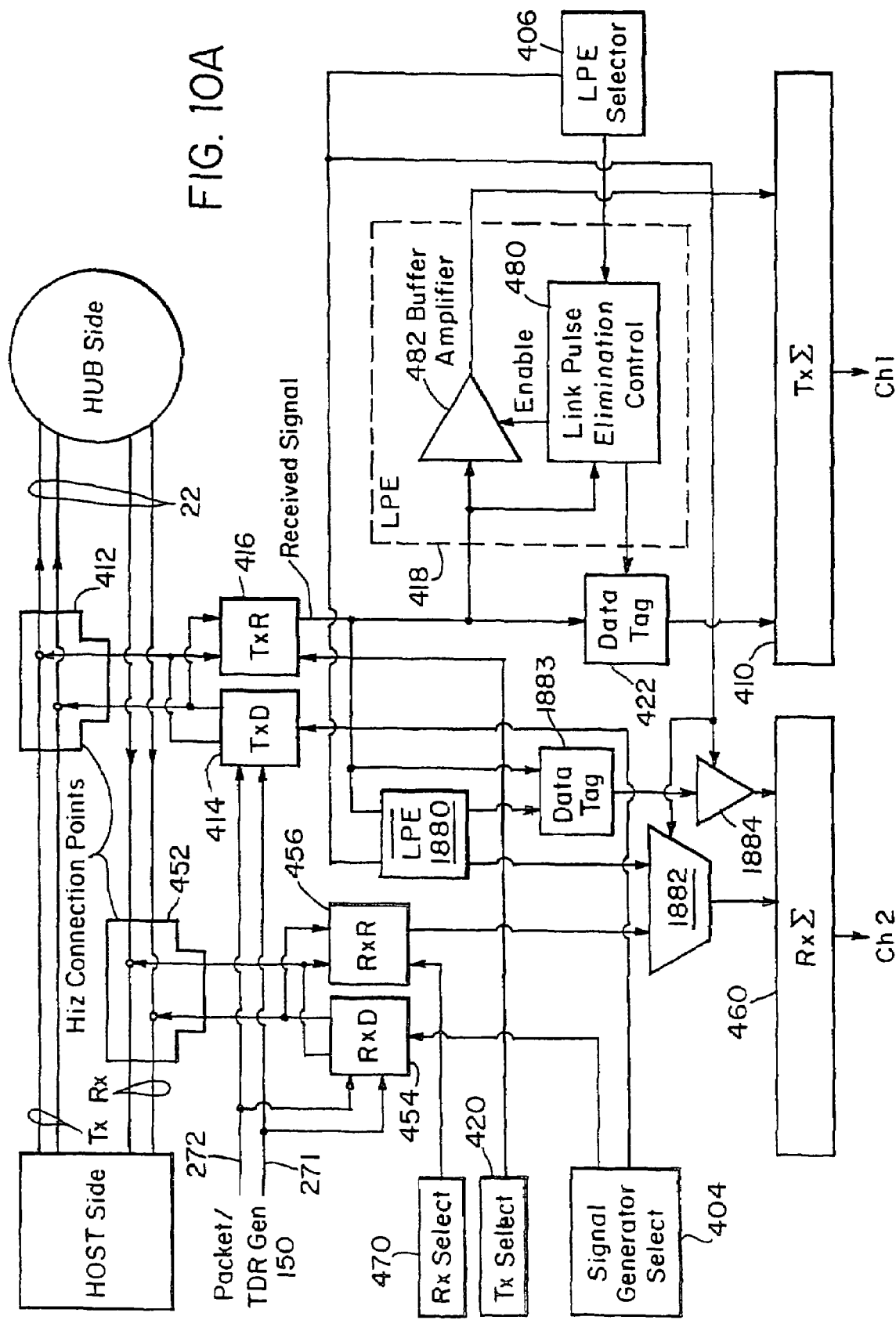
FIGS. 10A and 10B are circuit diagrams for another embodiment of the invention including a leading edge capturing circuit that captures portions of signals eliminated by the link pulse elimination circuit.

FIG. 10A is circuit diagram for another embodiment of the attachment unit 110 on one link 22 of the 10Base(T) network. This circuit preserves the signal information that is otherwise lost as a result of the link pulse elimination. A leading edge capturing circuit 1880 captures only the leading portions of signals that would otherwise be eliminated by the link pulse elimination circuit 418. The leading edge signals are sampled on the other channel Ch2 of the digitizer 120. A multiplexor 1882 enables the LPE selector 406 to determine whether Ch2 receives the Rx transmissions or the leading edge signals of the Tx transmissions. A data tagger 1883 is under control of the LPE selector to label the leading edge signals according to the link on which they originated. The output of tagger 1883 is transmitted to the Rx summer 460 via a buffer amplifier 1884, which is also controlled by the selector 406.

Figure 10B:
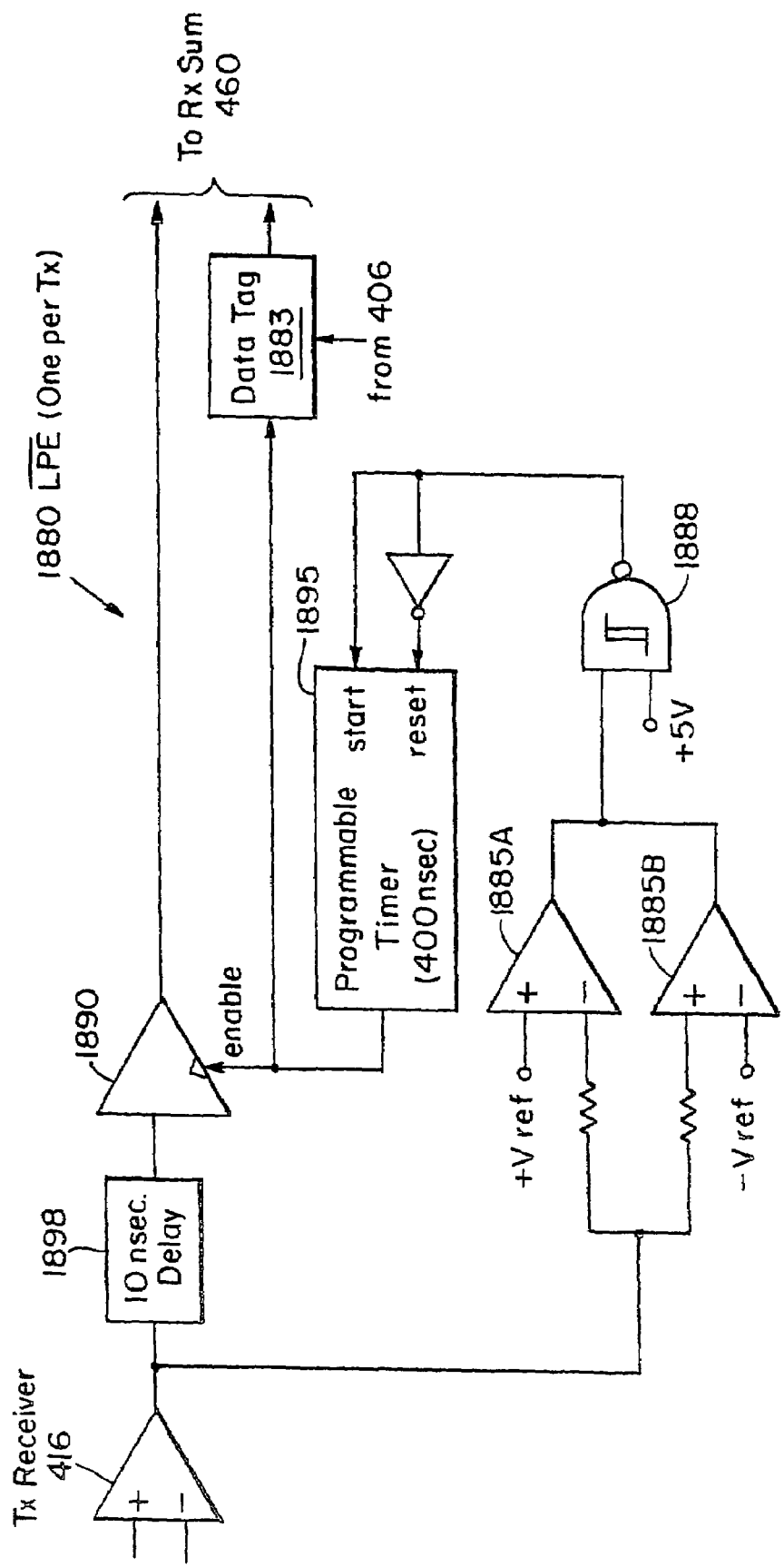

FIG. 10B is a more detailed circuit diagram of the leading edge capturing circuit 1880. The level of the output of the Tx receiver 416 is detected by two comparators 1885A,B receiving reference voltages Vref. The comparators 1885A,B drive a NAND gate 1888. The Vref is selected so that the comparators 1885A, B will trigger under the same conditions as the link pulse elimination circuit 418.

The comparators 1885A, B control the reset and start of a 400 nsec timer 1895 that enables and disables a buffer amplifier 1890. When enabled, the buffer amplifier 1890 passes the output from the Tx receiver 418, which is received through a 10 nsec delay 1898. As a result, the approximately 400 nsec long leading edge portions of signals that are typically eliminated due to the operation of the link pulse elimination circuitry can be selectively captured on Ch2 of the digitizer 120 while still preserving the link pulse elimination function.

The foregoing description of the attachment unit 110 has been generally specific to connecting the attachment unit 110 across the hub 20 of a 10Base(T)-type network. This same attachment unit, however, would be appropriate to monitor the transmissions to and from other types of network devices such as repeaters, concentrators, and switches. Switches, for example, connect in the same basic star network as the hub 20 in FIGS. 6A. A major difference in the context of the invention is the fact that each of the links 22 could have multiple hosts connected via a single pair of conductors and, more significantly, are in different collision domains. Consequently, the multiple link summation performed by Tx summer port 410 can not be supported. Only a single link could be monitored at one moment by each channel Ch1, Ch2 of the digitizer 120. Otherwise, different packets in different collision domains will be combined to result in non-physical waveforms. In another implementation, the attachment unit 110 shown in FIG. 5 could also be used in a switched environment. The linear amplifier 340 could be connected behind the switch. In this way, transmissions coming into the switch could be monitored as well as the transmission after being forwarded by the switch.

2. Hardware Operation

Figure 11:
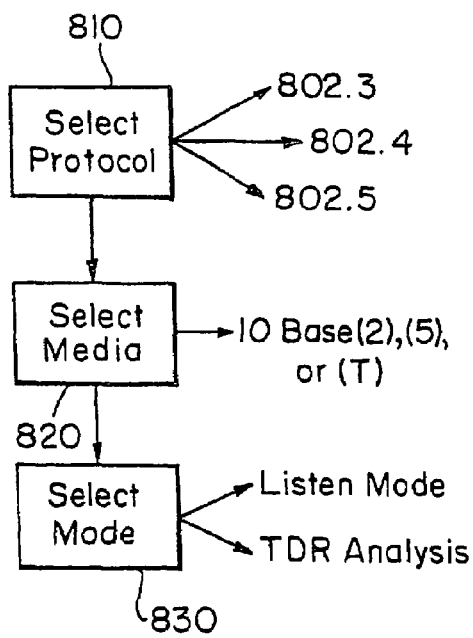
FIG. 11 shows the steps involved in initializing the inventive device.

FIG. 11 is a flow diagram illustrating the device initialization. The first step 810 involves selecting between the protocols that are supported by the device 100. A few illustrated options are CSMA/CD protocols such as IEEE 802.3 or token ring/bus protocols IEEE 802.4 and 802.5. More specific protocols such as Ethernet or fast Ethernet are other possibilities as are ATM and FDDI. Next, the media type must be input in step 820; 10Base(2), (5), and (T) are a few examples if CSMA/CD is selected in step 810. 100 MBPS media are also equivalents such as 100Base(T). Finally in step 830, the user must also select whether or not the system should actively probe the circuit for cabling problems in a TDR mode or passively listen to evaluate the performance of the network.

a. Listen Mode

Figure 12:
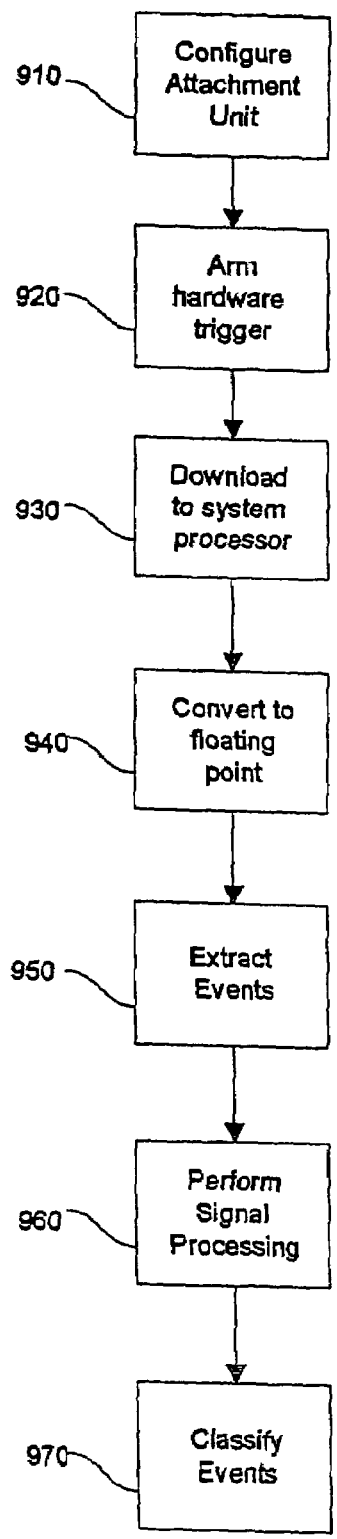
FIG. 12 shows the process steps performed for the listen mode of operation in which the device monitors the events on the network.

FIG. 12 shows the operation of the device in listen mode. First, system controller 140 configures the attachment unit 110 in step 910. For the 10Base(2) and (5) unit of FIG. 5, the single driver 310 must be disabled and the receivers 320a, 320b enabled. In the 10Base(T) attachment unit of FIGS. 6A and 6B, only one of the Rx receivers 456-1 to 456-n is enabled to sample of the hub transmissions. All of the Tx receivers 416-1 to 416-n are typically enabled by the Tx selector so that transmissions over the entire network are sampled. None of the Tx and Rx drivers 414, 454 is enabled by the Tx and Rx signal generator select 404. The other alternative configurations are also possible. When monitoring a switching device only one receiver will typically be enabled for each channel.

The digitizer 120 is then prepared to capture the event by arming the trigger 130 for Ch1 and Ch2 in step 920. At this point, the digitizer 120 will operate independently to capture the next event that satisfies the trigger thresholds.

After the events have been captured and stored in the digitizer 120, the system processor 140 downloads the captured data in step 930 from the digitizer for both Ch1 and Ch2. The system processor then makes a first pass over the data and converts it into an IEEE floating point format in step 940.

In step 950, the signal processor 140 again passes over the data and generates a histogram showing the voltage distributions for the sampled array of data. From this statistical analysis, the system processor 120 develops software event thresholds, Thres_High and Thres_Low. Essentially, thresholds are found that will yield a reasonable number of events from the data array. The thresholds are then applied to the data to extract the events, and their start and stop times.

Figure 13:
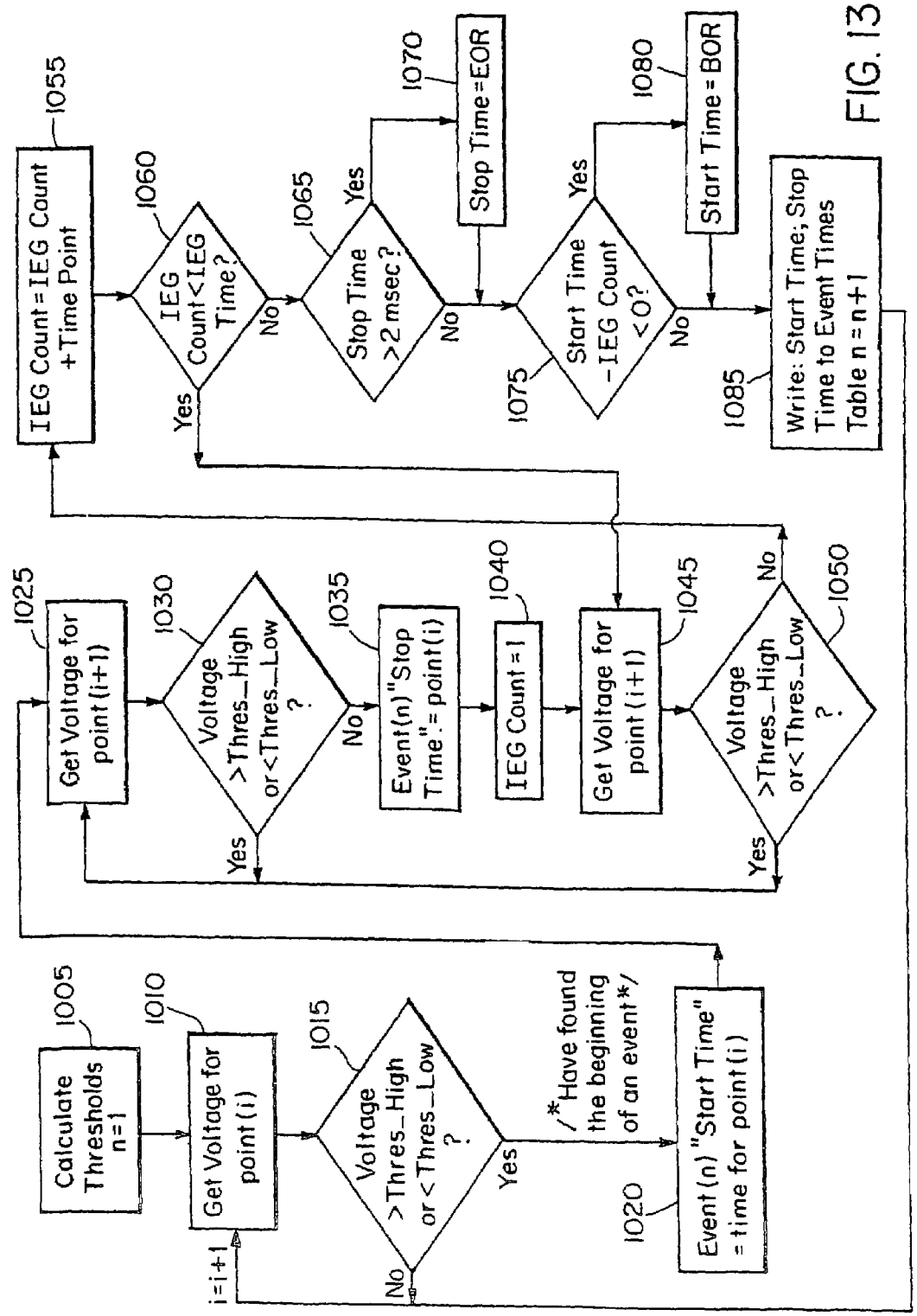
FIG. 13 is a process diagram showing the process for finding events in the data arrays of the invention.

FIG. 13 is a flow diagram showing the process for extracting the events. In steps 1005 to 1015, the system processor 120 increments through the data applying the high and low software thresholds, Thres_High and Thres_Low. The start time for event n is set in step 1020 when the thresholds are satisfied.

In steps 1025 and 1030, the processor passes through the data points within the Event(n) until the thresholds are no longer satisfied. The stop time for Event(n) is then set in step 1035. In the following steps 1040-1060, the array pointer point(I) is incremented, a variable IEG Count incremented by the sampling period for the data array (Time/point), and then IEG Count is compared to a constant IEG Time. IEG time, preferably 500 nanoseconds (nsec), corresponds to the maximum Inter Event Gap in which the sampled points may be sub-threshold and an event still declared. If the thresholds are satisfied anytime within the IEG time, control returns to steps 1025 and 1030, indicating the continuation of the Event(n). These steps compensate for situations in which lone aberrant data points will prematurely terminate an otherwise continuous event. In other words, the event extraction process will not terminate an event condition in response to a sub-threshold data points of less than 500 nsec.

In steps 1065 to 1080, events stretching across the end or the beginning of the data array are indicated by setting the stop time to EOR (end of record) and start time to BOR (beginning of record), respectively. Typically, these events are discarded as being incomplete.

Finally, in step 1085 the stop and start time of Event(n) are saved. Program flow then returns to step 1010 to find the next event.

Returning to the flow diagram in FIG. 12, once the events have been located in the data array, an absolute time is determined for each of the events based upon the location of the events in the data array and the time when hardware trigger was activated for the each channel. This places the events from the channels in a common time frame. In steps 960, signal processing is performed. Specifically, the attributes or parameters shown in Table I below are computed for each event and for each channel.

TABLE I

| PARAMETERS | |
|---|---|
| 1. Midpoint | min, max, mean, quantity |
| 2. Preamble Frequency | min, max, mean, sdev |
| 3a. Entire Event Frequency High | min, max, mean, sdev |
| 3b. Entire Event Frequency Low | min, max, mean, sdev |
| 4a. End of Event Frequency High | min, max, mean, sdev |
| 4b. End of Event Frequency Low | min, max, mean, sdev |
| 5. Maximum Voltage Distribution | min, max, mean, sdev |
| 6. Minimum Voltage Distribution | min, max, mean, sdev |
| 7. Peak to Peak Distribution | min, max, mean, sdev |

TABLE I-continued

| PARAMETERS | |
|---|---|
| 8. Rise Time | min, max, mean, sdev |
| 9. Fall Time | min, max, mean, sdev |
| 10. Overshoot | min, max, mean, sdev |
| 11. Undershoot | min, max, mean, sdev |
| 12. First Bit peak-to-peak Voltage | |
| 13. First Bit Min Voltage | |
| 14. First Bit Max Voltage | |
| 15. First Bit Width Voltage | |
| 16. First Bit Rise Time | |
| 17. First Bit Fall Time | |
| 18. Jitter | min, max, mean, sdev |

The meaning or relevance of each of these parameters is evident from the description. For example, preamble frequency refers to the frequency in the preamble of a packet event. The event frequencies high and low for the entire and end of event refer to the high and low frequency peaks in the spectral distribution. Parameters 8-17 provide information that is more descriptive of the ability of the source to drive the network cabling dependably and with adequate power. The rise times and fall times quantify the sharpness of the voltage transitions. Maximum/minimum voltages indicate whether the voltage levels are with the media's specifications.

The midpoints refer to the center values or mean positions across a set of transitions. For example, in 10Base(2)(5) the mean point of a typical packet will usually be −0.8 volts, halfway between the 0 Volt idle and the maximum non-collision voltage swing of −1.6 volts. To calculate midpoints, the average values are determined for each voltage transition and then a histogram of the values is generated. The midpoints are extracted from the histograms by searching looking for groupings of the average values. Midpoint analysis is helpful in determining whether a collision has occurred. The classic collision waveform appears as a two-sided staircase, or possibly more accurately a stepped pyramid. A typical 2-party collision will have two midpoints for the event. The first midpoint corresponding to the time when the first transmitter is broadcasting alone, the second, higher level midpoint occurring when both transmitters are broadcasting simultaneously, and a third midpoint, typically equal to the first midpoint, that resulting from the second in time transmitter broadcasting alone after the first broadcaster has terminated its transmission in response to the collision. A usually greater number of midpoints will be generated when more than two sources collide simultaneously.

Based upon the calculated attributes, the event is classified in step 970 as being a collision, a packet, noise, interference or crosstalk using parametric analysis. The Table II below is the Parameter Range Table against which the event classifications are made.

TABLE II

| PARAMETER | UNITS | COLLISION_1 | COLLISION_2 | COLLISION_3 | COLLISION_4 |
|---|---|---|---|---|---|
| Midpoint Quantity | | 1:1 | 2:2 | 3:3 | 4:4 |
| Midpoint mean | Volts | −1.4:−4.42 | | | |
| Midpoint mean | Volts | | −1.8:−4.5 | | |
| Midpoint mean | Volts | | | −2.3:−5.22 | |
| Midpoint mean | Volts | | | | −3.78:−5.22 |
| Peak-peak Distr. Max | Volts | | | | |
| Peak-peak Distr. SDEV | Volts | | | | |
| Min. Voltage Distr. Max | Volts | | | | |
| Max Voltage Distr. Max | Volts | 0.2:−7 | 0.2:−7 | 0.2:−7 | 0.2:−7 |
| Preamble Frequency | MHZ | | | | |
| End of Event Frequency High Mean | MHZ | | | | |
| Entire Event Frequency High Mean | MHZ | | | | |
| Entire event frequency High SDEV | MHZ | | | | |
| Max Voltage Distr. SDEV | Volts | | | | |

| PARAMETER | UNITS | PACKET_1 | PACKET_2 | NOISE_1 | NOISE_2 | NOISE_3 |
|---|---|---|---|---|---|---|
| Midpoint Quantity | | 1:1 | 1:1 | 0:1 | 0:1 | 0:1 |
| Midpoint mean | Volts | −0.3:−1.35 | −0.3:−1.35 | 0:−1.35 | 0:−1.35 | 0:−1.35 |
| Midpoint mean | Volts | | | | | |
| Midpoint mean | Volts | | | | | |
| Midpoint mean | Volts | | | | | |
| Peak-peak Distr. Max | Volts | .3:2.8 | .3:2.8 | | | |
| Peak-peak Distr. SDEV | Volts | 0:0.245 | 0:0.245 | 0.25:1 | 0:0.245 | 0.25:1 |
| Min. Voltage Distr. Max | Volts | 0:0.245 | 0:0.245 | 0.25:1 | 0:0.245 | 0.25:1 |
| Max Voltage Distr. Max | Volts | 0.2:−1 | 0.2:−1 | 0.2:−7 | 0.2:−7 | 0.2:−7 |
| Preamble Frequency | Volts | 4.5-5.5 | 5.5:13 | | | |
| End of Event Frequency High Mean | MHZ | 1.7:13 | 1.7:13 | | | |
| Entire Event Frequency High Mean | MHZ | 1.7:13 | 1.7:13 | | | |
| Entire Event Frequency High SDEV | MHZ | 0:0.7 | 0:0.7 | 0:0.7 | 0.71:10 | 0.71:10 |
| Max Voltage Distr. SDEV | MHZ | | | | | |

| PARAMETER | UNITS | INTERFERENCE (TRANSIENT) | XTALK (4 MHZ) | XTALK (10 MHZ) | XTALK (16 MHZ) | XTALK (100 MHZ) |
|---|---|---|---|---|---|---|
| Midpoint Quantity | | | | | | |
| Midpoint mean | Volts | | | | | |
| Midpoint mean | Volts | | | | | |
| Midpoint mean | Volts | | | | | |
| Midpoint mean | Volts | | | | | |
| Peak-peak Distr. Max | Volts | | | | | |
| Peak-peak Distr. SDEV | Volts | | | | | |

TABLE II-continued

| | | | | | | |
|---|---|---|---|---|---|---|
| Min. Voltage Distr. Max | Volts | | | | | |
| Max Voltage Distr. Max | Volts | 0.205:1 | 0.205:1 | 0.205:1 | 0.205:1 | 0.205:1 |
| Preamble Frequency | Volts | | | | | |
| End of Event Frequency High Mean | MHZ | | | | | |
| Entire Event Frequency High Mean | MHZ | | 3.6:4.4 | 9:11 | 14.4:17.6 | 90:110 |
| Entire Event Frequency High SDEV | MHZ | | | | | |
| Max Voltage Distr. SDEV | Volts | 0.02:1 | 0.02:1 | 0.02:1 | 0.02:1 | 0.02:1 |

Table II shows the criteria for characterizing the 10Base (2)(5) events. The classification Collision_1 indicates a waveform that has the requisite voltage levels for a collision, but the classic staircase or pyramid waveform was not produced since there is only a single midpoint. This usually occurs when the colliders begin broadcasting at precisely the same moment from the perspective of the device 100. Collision_2, Collision_3, and Collision_4 denote collisions typically between 2, 3, and 4 parties, respectively. In the case of each of these collision classifications, the classic staircase or pyramid waveform is formed since each of the classifications require that at least 2 or up to four midpoints are produced during the collision.

The difference between classifications packet_1 and packet_2 derives from the frequency of the preamble. Packet_1 indicates the typical packet in which the voltage distributions, midpoint voltages, and midpoint quantities generally indicate a properly generated packet within the media's specifications. Packet_2 indicates a packet that has otherwise generally valid parameters but is out of specification with regard to transmission frequency since the classification is inclusive of preamble frequencies up to 13 MHZ. Typically in 10 megabit per second networks, the preamble frequency should be close to 5 MHZ.

Three different noise classifications are provided: Noise_1, Noise_2, and Noise_3. The classifications are generally designed to pick up most transmissions that are produced by network device but fall outside the packet classification. Noise_1 is designed for malfunctioning source device amplifiers. The classification has a relatively tight frequency distribution parameter but relatively broad voltage amplitude parameters to indicate source devices that are out of specification with regard to the voltages they produce. Noise_2 has very broad parameters for frequency distribution, but tighter parameters with regard to the voltages on the line. In fact, the voltage distributions are similar to those for a packet. Thus, Noise_2 is designed to pick up transmitters that are out of specification with regard to frequency indicating a bad transmission clock, but are generally driving the lines with the proper voltage. Finally, Noise_3 is designed to pick up transmitters that are out of specification both with regard to frequency and amplitude. It has a very broad range for the frequency standard deviation and for minimum/maximum voltage distributions.

The parameters for interference are generally broad and few in number. This classification is designed to be satisfied when interference sources from outside the network generate voltages on the network cabling. Finally, the device is designed to find specific frequencies of crosstalk. Four different classifications are provided for 4, 10, 16, and 100 MHZ. These are usually satisfied where the interference has a particular frequency that would indicate its origin is another network or communications devices.

Figure 14:
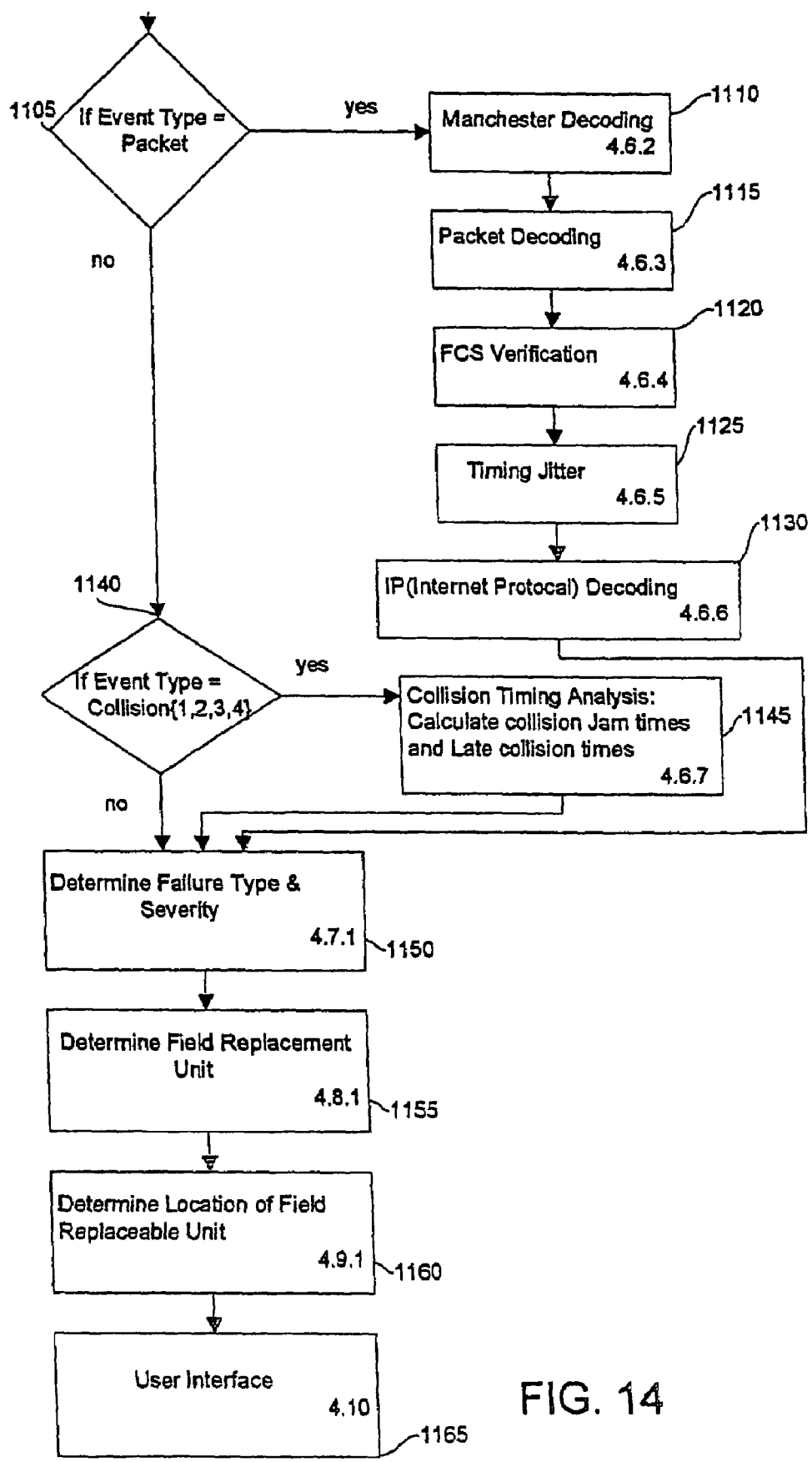
FIG. 14 show the process of further analysis and classification that is performed on packet and collision events in the invention.

FIG. 14 illustrates further analysis that is performed for packets and collisions. In the case of events that are classified as packets, the process branches to determine the digital contents of the packets in step 1105. This is similar to the analysis that would be performed by a protocol analyzer but the analysis is based upon the sampled array of data captured by the digitizer. Manchester decoding is first performed in step 1110 by again passing over the data and finding the location of transitions. According to this coding technique, a 0 is represented by transition from high to low across the period of the bit, and a 1 is represented by a transition from low to high across the period of the bit. This scheme ensures that every bit has a transition in the middle, and this makes it easier for the receiver to synchronize to the decoder.

Figure 15A:
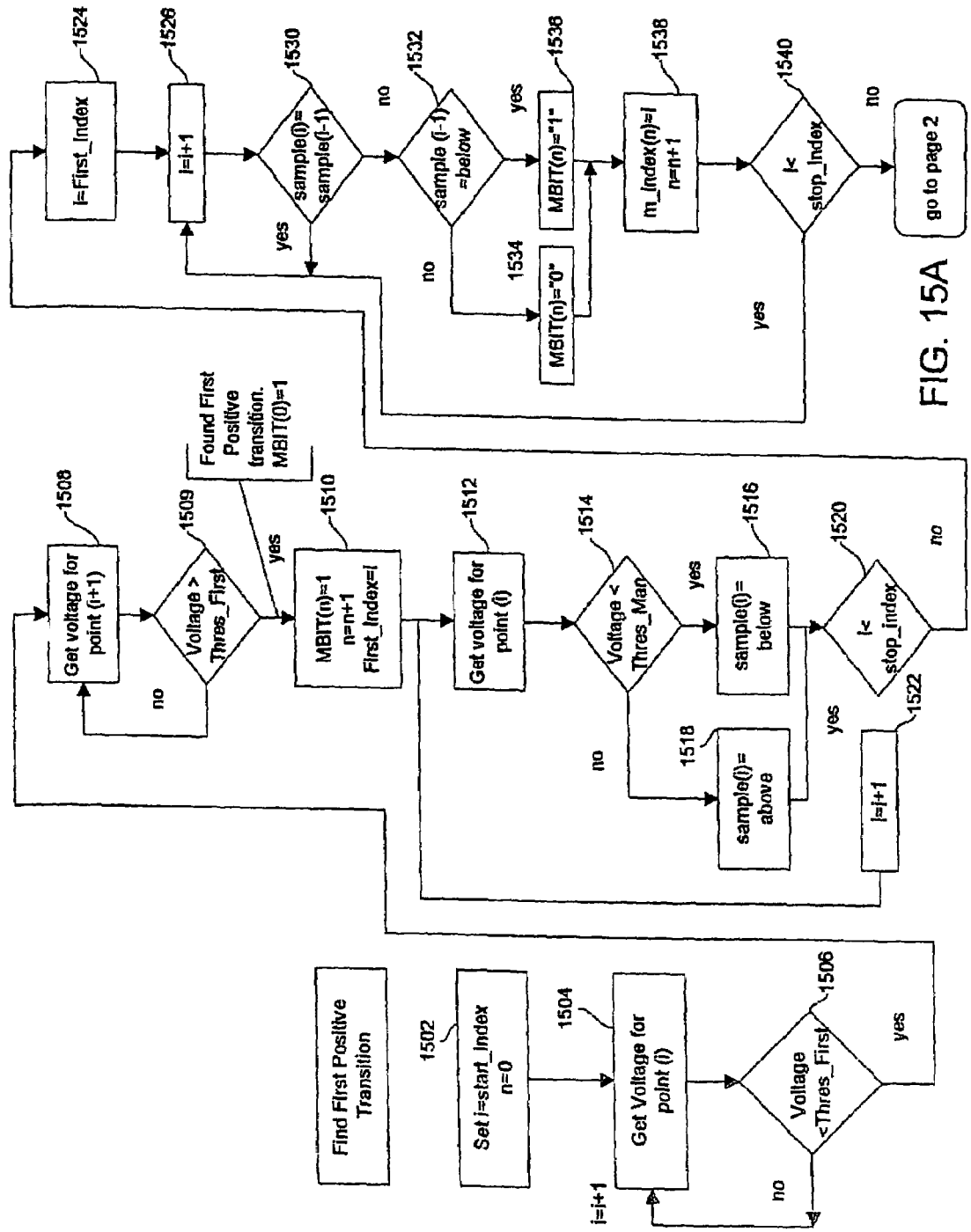
FIGS. 15A and 15B are a flow diagram showing method for Manchester decoding the sampled packet transmissions of the present invention.
Figure 15B:
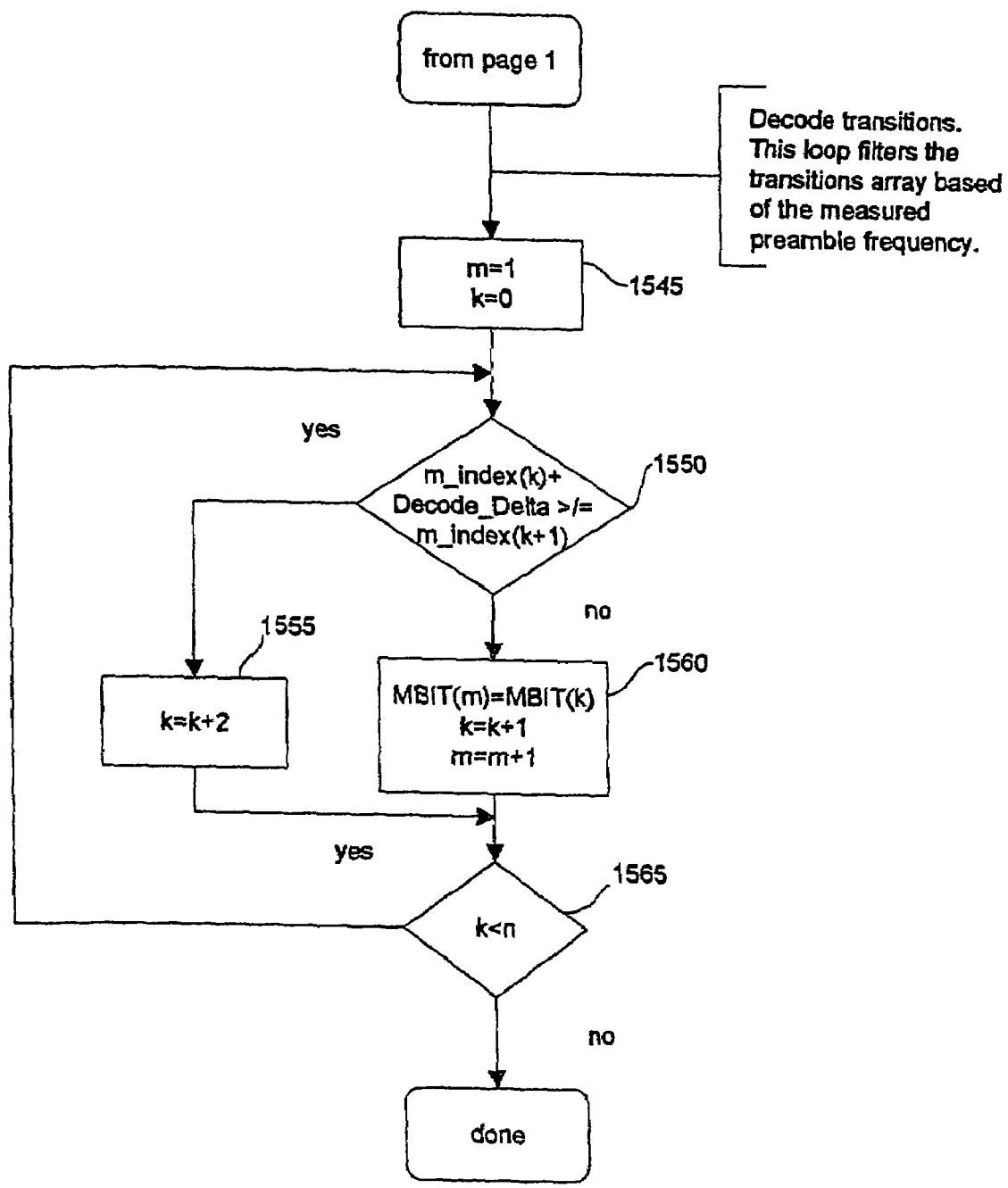

The Manchester decoding process for a digitally sampled packet/frame transmission is shown in FIGS. 15B and 15B in detail. Some aspects of the process are specific to 10Base (2)(5) type networks, but those skilled in the art will understand that the general principles can be applied to other networks.

Inputs to the decoding process are the array of sampled voltages (point(I)) downloaded from the digitizer and the event location information (event(n)) developed by the event finder processing. The output is an array MBIT(n) that represents the successive bits in the Manchester decoded packet/frame.

The first operation performed in the Manchester decoding entails finding the first positive-going transition in the packet in steps 1502-1509. In 10Base(2)(5) media, this event represents the end of the first bit of the preamble. The variable I is set to start_index, which represents the location where the beginning of the packet event is located. Then, Thres_First is applied to the next data points in point(I) until the stored sampled voltage is less than Thres_First. Satisfaction of this comparison means that the start of the transmission, the first negative going transition of the preamble in a 10Base(2) or (5) data transmission, has been found. Recall that in 10Base(2) or (5), the voltage varies between 0 and −1.6 Volts.

The value of the Thres_First constant derives from the first bit parameters calculated as part of the signal processing parameters of Table I. By reference to such parameters as First Bit MI, MAX Voltages and First Bit Width Voltage, Thres_First is specified to ensure that the first bit can be located in the Manchester decoding.

In steps 1508 and 1509, the next data points are again compared to Thres_First to determine when a voltage now exceeds the constant. When 1509 is satisfied, the first positive transition has been found, and the first data point of the array MBIT is initialized to 1.

Steps 1512-1522 construct a new array sample(I) that holds the information whether each data point in the array of sampled voltage point(I) is above or below a Manchester decoding threshold Thres_Man. Each successive voltage is compared to the Manchester decoding threshold in step 1514 and the corresponding value in the array sample(I) set to either above or below in steps 1518 and 1516. The process in repeated with the pointer variable being incremented in step 1522 until the end of the event is reached, as determined in step 1520.

The Manchester decoding threshold Thres_Man is also derived from the parameters shown in Table I. Parameters such as Maximum Voltage Distribution, and Minimum Voltage Distribution, which are predictive of the typical, i.e., other than first bit, voltage transitions in the packet, are used to calculate the threshold.

Next, in steps 1524-1540, pointer(I) is reset to First_Index to step through the array sample(I) to find the transitions after the first bit and store into MBIT whether each transition is low to high or high to low. A second indexing array m_index(n) holds the location of transitions in the packet by reference to the pointer variable used to step through the sample(I) array.

In detail, in steps 1526 and 1530, the pointer (I) is incremented until successive points in sample(I) are different. If (I-1) was below Thres_Man then the corresponding position in the MBIT array is set to 1 indicating a positive-going transition between (I-1) and (I); otherwise, MBIT is set to 0 indicating a negative-going transition between (I-1) and I. m_index holds the corresponding location of the transition stored in the array MBIT. This process repeats itself until stop_index is detected in step 1540.

Steps 1545 to 1560 determine whether the transitions represent a bit of data or simply a preliminary transition prior to a bit transition. Recall that in Manchester encoding, a 1 is represented from a low to high transition, and a 0 is represented by a high to low transition. If two successive 1's or 0's are sent, however, there must be an intermediate or preliminary transition to enable the voltage to again make the appropriate transition. These intermediate transitions are not directly indicative of data and therefore, must be ignored when determining the encoded data bits. Only the transitions at a clock edge represent valid data bits. This function is accomplished in steps 1550, 1555, and 1560 in which the intermediate transitions are filtered out and the array MBIT repacked with only the decoded data bits of the packet.

The filtering process is accomplished by defining a constant Decode_Delta. This constant represents the minimum number of data points or samples that will exist between two valid data transitions. This is calculated by determining the bit period by reference to the preamble frequency calculated in Table I. In a 10 megabit per second network, the ideal bit period will be 100 microseconds. This is multiplied by a factor representing the maximum conceivable clock skew. For example, if the maximum clock skew is never greater than 25 percent, subsequent bits should never be closer than 75 microsecond. This is multiplied by the sampling frequency period to determine the corresponding number of bit periods in the point(I).

Decode_Delta=(bit period) * (0.75) * (sampling frequency)

Steps 1550 determines whether successive locations in the m_index array are greater than Decode_delta apart. If the two locations are separated by less than Decode_delta, the bit is ignored; and if the separation is greater, the bit is repacked into the MBIT array. Thus, when the process is completed, the array MBIT contains an array of the decoded data bits.

Packet decoding is then performed in step 1115 followed by FCS verification in step 1120. This is a cyclic redundancy check to assist in determining whether or not any errors have occurred in the transmission of the packet. Transmitter timing jitter is also determined in step 1125 by looking at bit periods in the preamble and across the remainder of the packet. Finally, if relevant, InterNet protocol decoding is also performed in step 1130.

The next step in FIG. 14 is packet decoding, which is based upon the MBIT array generated in the Manchester decoding, provides information regarding whether or not the packet was properly formatted. For example, the preamble can be reviewed to make sure there are no consecutive zeros since the preamble should only contain a 5 MHZ square wave. The destination and source suffixes and prefixes can be checked to ensure they have the proper values. The CRC data of the frame check sequence (FCS) can be compared to the ones and zeros of the packet to determine whether there is agreement. The total length of the packet can be reviewed to make sure that it is not too long or too short. The length of the preamble and the set frame delimiter (SFD) are reviewed to ensure that it has the proper length. Further, the inter-event gap EEG, being the time between the end of the packet and the beginning of the next broadcast, is checked to make sure that it is at least the 9.6 microsecond specification for this time.

Figure 16A:
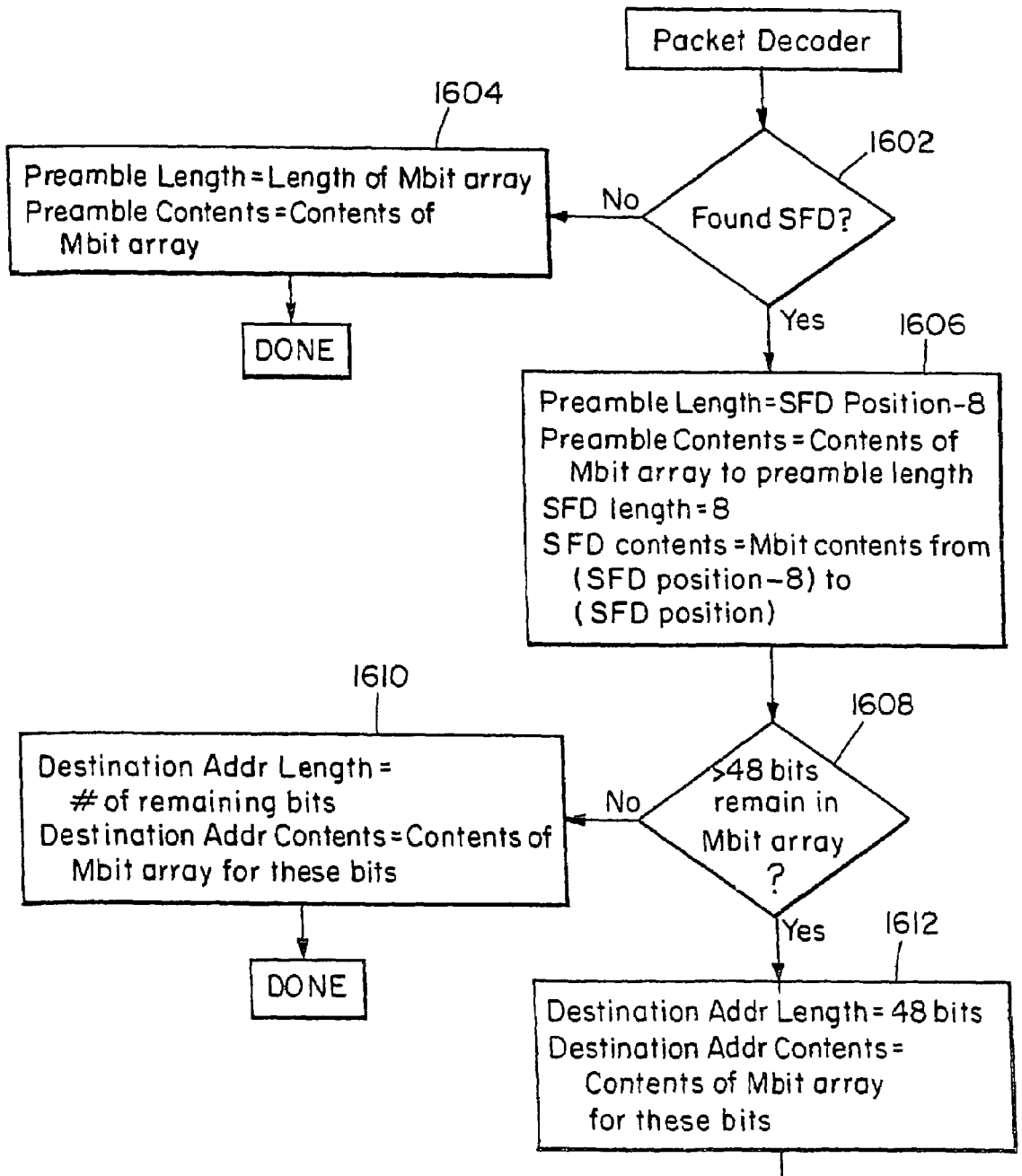
FIGS. 16A and 16B are a flow diagram showing method for packet decoding the Manchester decoded transmissions of the present invention.
Figure 16A:
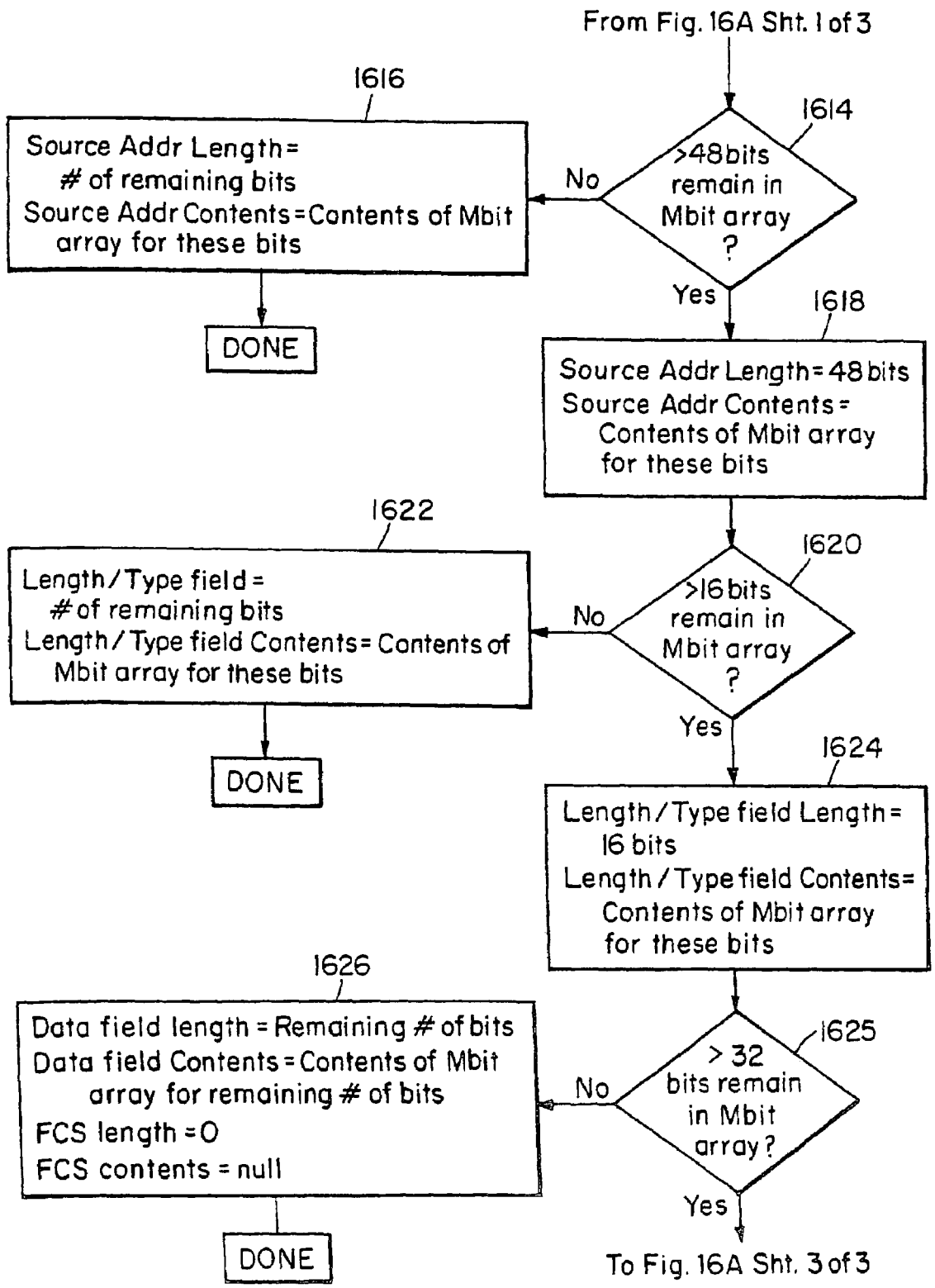
Figure 16A:
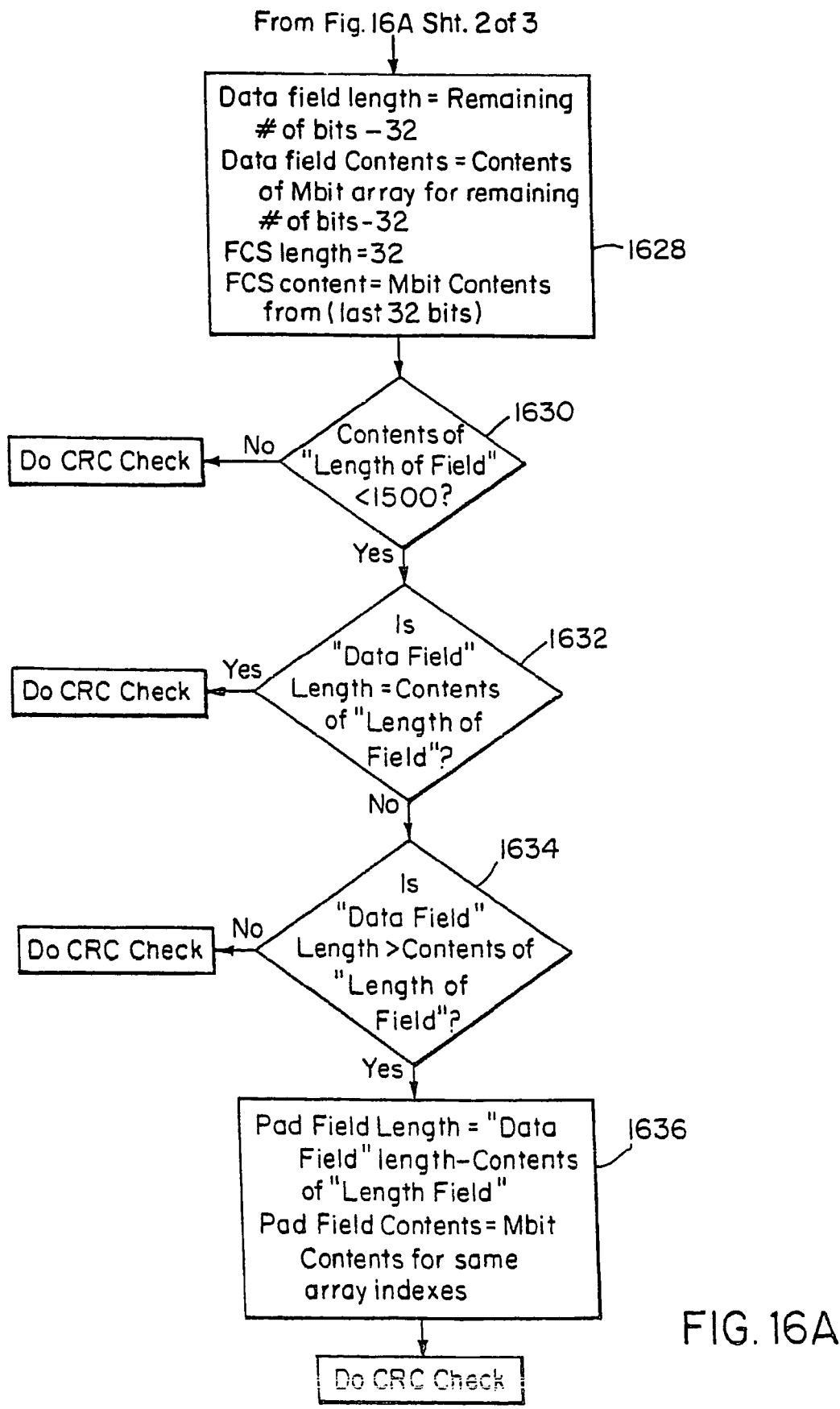
Figure 16B:
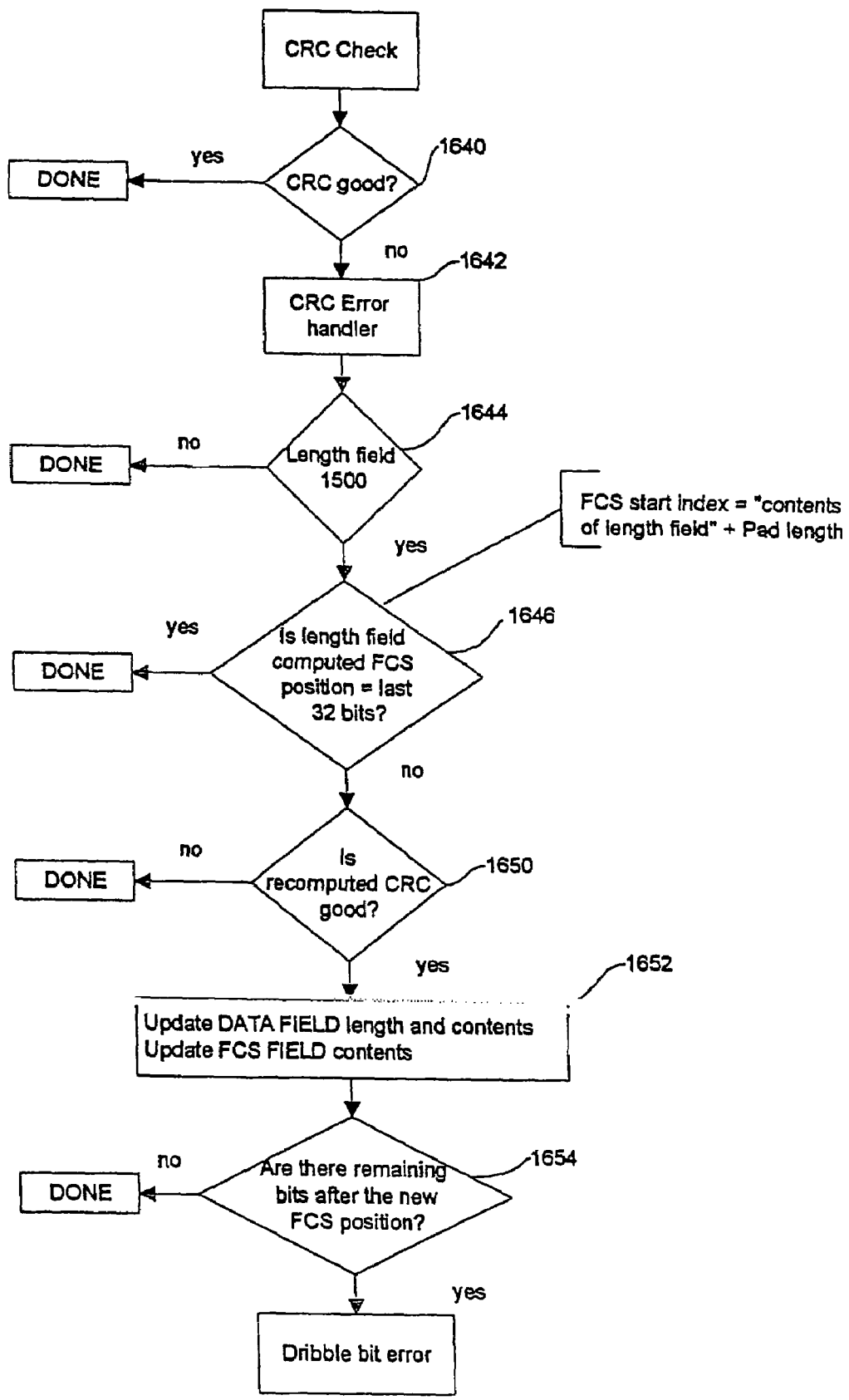

FIGS. 16A and 16B illustrate the packet decoding process. The specific example formats binary data according to the IEEE data structure. The process operates on the data array MBIT produced from the Manchester decoder and determines the length and contents of the preamble, destination address, source address, length/type field, LLC data field, and the FCS field. Also, it indicates if there is a CRC or dribble bit error.

The packet decoder begins by finding the successive 1's of the start of frame delimiter (SFD). If the SFD is not found in step 1602, the preamble length is set to the length of the MBIT array and the preamble contents are set to the MBIT array's contents in step 1604. If the SFD is found, then in step 1606, the preamble length is set to the (SFD position-8) and the preamble contents are set to the contents of the MBIT array up to the preamble length. The SFD length is set to 8, and the SFD contents are set to the MBIT contents between the end of the preamble and SFD position.

In steps 1608, the number of bits remaining in the MBIT array is checked. If it is less than 48 bits, the destination address is set to the number of remaining bits and the contents of the destination address are set to the contents of the MBIT array for these bits in step 1610. If, however, 48 bits remain in the MBIT array, then these bits are set to the destination contents, and the address length is set to 48 bits in step 1612.

Again, in step 1614, it is determined whether another 48 bits remain in the MBIT array. If 48 bits do not remain, the source address length and contents are set in view of these remaining bits in step 1616. If 48 bits do remain, however, they are assigned to the source address contents and the source address length is set to 48 bits in step 1618.

In steps 1620, 1622, and 1624 the next 16 bits are set to the length/type field contents and length if they exist.

The remaining number of bits in the MBIT array is checked in step 1624 to determine if greater than 32 bits remain. If less than 32 bit remain, then these remaining bits are set as the data field contents and the length is set to the number of remaining bits. If greater than 32 bits remain, then the data field length is set to the number of remaining bits −32. The last 32 bits are assumed to be the frame check sequence (FCS) used in the CRC check.

Steps 1630 and 1632 are relevant to whether the packet conforms with the Ethernet (trademark) packet format or the format set forth in IEEE 802.3 format. In 802.3, the length/field indicates the length of the data portion of the packet; in Ethernet, the field is a type field which is always less than 1,500. If the field length is greater than 1,500 as determined in step 1630, this indicates an 802.3 type packet allowing more processing to take place. In steps 1632, 1634, and 1636, the length field is used to determine the length and contents of any pad field.

FIG. 16B shows the steps involved in the CRC check. In step 1640, the CRC algorithm is applied to the packet contents. If there is agreement between the result and the FCS variable, the CRC is good and processing is completed. If, however, an error is determined further processing takes place to determine if a dribble bit error is the source of the CRC failure.

Steps 1642-1654 concern the recalculation of the CRC in the possible situation of a dribble bit error. In the preceding analysis, the 32 bits of the FCS were assumed to be the last 32 bits of the packet, which will lead to an error if a dribble bit, a random bit at the end of the packet, is present. The FCS bits, however, can be alternatively located according to the length/type field in 802.3. This double-check can not be performed on the packet was formatted under the Ethernet (trademark) regime, which is determined in step 1644. In step 1646, the location of the FCS is determined from the length field rather than assuming it is the last 32 bits. If agreement exists between the field length calculated FCS and the last 32 bits of the packet, no further computing can be performed, and the CRC is concluded to be bad indicating a transmission error or similar problem. If the length field determined FCS is different, then the CRC is recomputed in the 1652. If the recomputed CRC is still bad than the packet is again concluded to be invalid. A good CRC calculation here, however, indicates a dribble bit error. The data field contents and FCS fields updated in step 1652. The remaining bits after this newly located bits, if any, are then assumed to be dribble bits in step 1654.

It should be noted, however, that this packet analysis can be carried out even if there is some problem in packet formatting in contrast to the operation of the protocol analyzer. The analyzer will only decode properly formatted packets. A packet that does not conform to the error connect scheme, for example, will be discarded without further processing. In contrast, the present process can still analyze the data contents of the packet to extract any available information. In fact each transition can be analyzed to determined why an typical digital decoding device would fail to decode the packet.

Returning to FIG. 14, when the event type is a collision, the process branches to perform collision timing analysis in step 1140. The start and stop times for parties participating in the collision are determined in step 1145. In a properly operating network, the difference between the start times for the two colliders should not be greater than the time it takes for a signal to propagate across the entire length of the network. If the start time is greater than the total propagation time, it means that the second in time party should have realized a transmission was occurring on the network and not started its own transmission. This is a late collision. The jam times are also found and compared to the specifications of the network.

Figure 17:
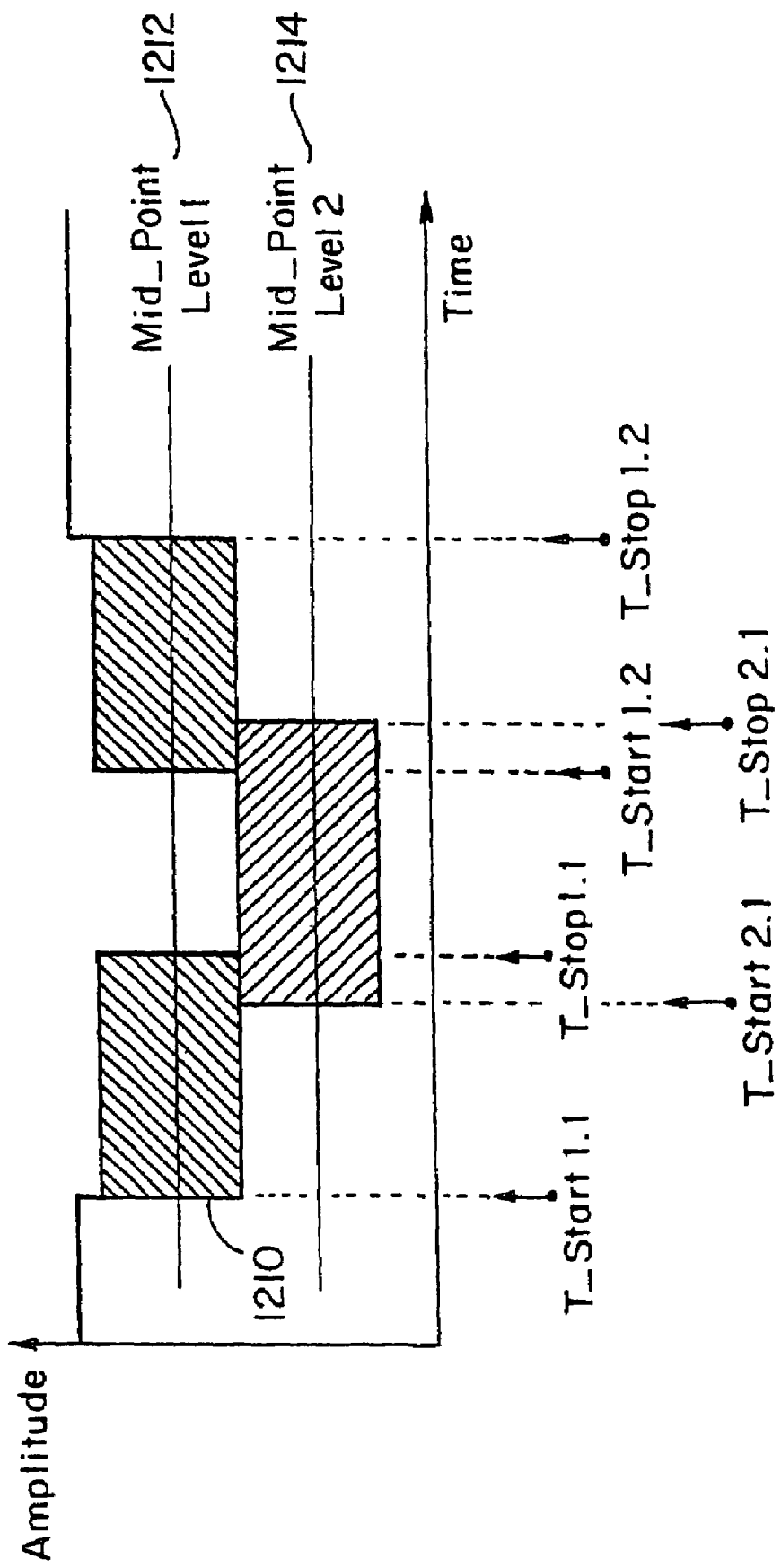
FIG. 17 shows an exemplary 10 Base(2)(5) collision waveform and the data extracted from it.

FIG. 17 shows an exemplary collision waveform 1210 and the timing information (T_Start and T_Stop Times) that are extracted from the waveform during the collision analysis. Specifically, for the level 1 and level 2 midpoints, the start and stop times are determined. This provides information regarding whether the jam times are too long or too short for each of the nodes taking part in the collision and whether any late collisions took place.

Returning to FIG. 14, if, in the packet or collision analysis, any failures or improper operation have been detected, the source is identified and the severity determined in step 1150. This can be accomplished a number of ways. The source addresses of packets can be decoded. In the present invention, this decoding can occur even in the case of a collision by extracting the source address from the waveform. Also, the source of packets that fail error checking can usually be determined by matching the source address to the possible addresses in the network. In the case of noise or invalid packets, the 10Base(2) and (5) attachment unit also allows the location of the source to be identified by comparing the time of receipt at Ch1 and Ch2 of the digitizer. In fact, 500 MHz sampling frequency provides a resolution of less than a meter when the length of the cable 350 to the linear amplifier 340 is know. The 10Base(T) unit has the tagging circuits 422 that identify the link from which the event originated.

Table III below lists the failure types for Event Type. In the table, DEST refers to destination address, SRC to source address, CRC to cyclic redundancy check, SFD to start of frame, delimiter, and IFG to interframe gap.

TABLE III

FAILURE TYPES BY EVENT TYPE

| PACKET | COLLISION 1 | COLLISION 2 | COLLISION 3 | COLLISION 4 |
| --- | --- | --- | --- | --- |
| 00 in Preamble | Jam too long | Jam too long | Jam too long | Jam too long |
| Wrong Value in DEST Suffix | Jam too short | Jam too short | Jam too short | Jam too short |
| Wrong Value in SRC Suffix | IFG Before <9.6 µsec | Late Collision | Late Collision | Late Collision |
| Wrong Value in DEST Prefix | IFG Before <9.6 µsec | IFG Before <9.6 µsec | IFG Befare <9.6 µsec | |
| Wrong Value in SRC Prefix | | | | |
| Wrong Value in CRC | | | | |
| Bit Alignment | | | | |
| Runt packet | | | | |
| Giant packet | | | | |
| Preamble + SFD too Short | | | | |
| Preamble + SFD too Long | | | | |
| Length After SFD Short – HOLD | | | | |

TABLE III-continued

FAILURE TYPES BY EVENT TYPE

Length After SFD Long – HOLD
Data Wrong Length
Signature
IFG Before <9.6 μsec

| NOISE 1 | NOISE 2 | NOISE 3 | INTERFERENCE (TRAN) | XTALK(4 MHz) |
|---|---|---|---|---|
| Noise<br>IFG Before <9.6 μsec | Noise<br>IFG Before <9.6 μsec | Noise<br>IFG Before <9.6 μsec | Interference | Xtalk (Token Ring) |

| XTALK (16 MHz) | XTALK (10 MHZ) | XTALK (100 MHz) |
|---|---|---|
| Xtalk (Token Ring Fast) | Xtalk (Ethernet) | Xtalk (Ethernet 100) |

If the failure merits corrective action, the system assesses which unit on the node or the cabling should be replaced in step 1155. Further, the location of this unit among the various nodes is also determined in step 1160 and then this provided to the user interface to inform a technician as to the appropriate corrective action in step 1165.

Figure 18:
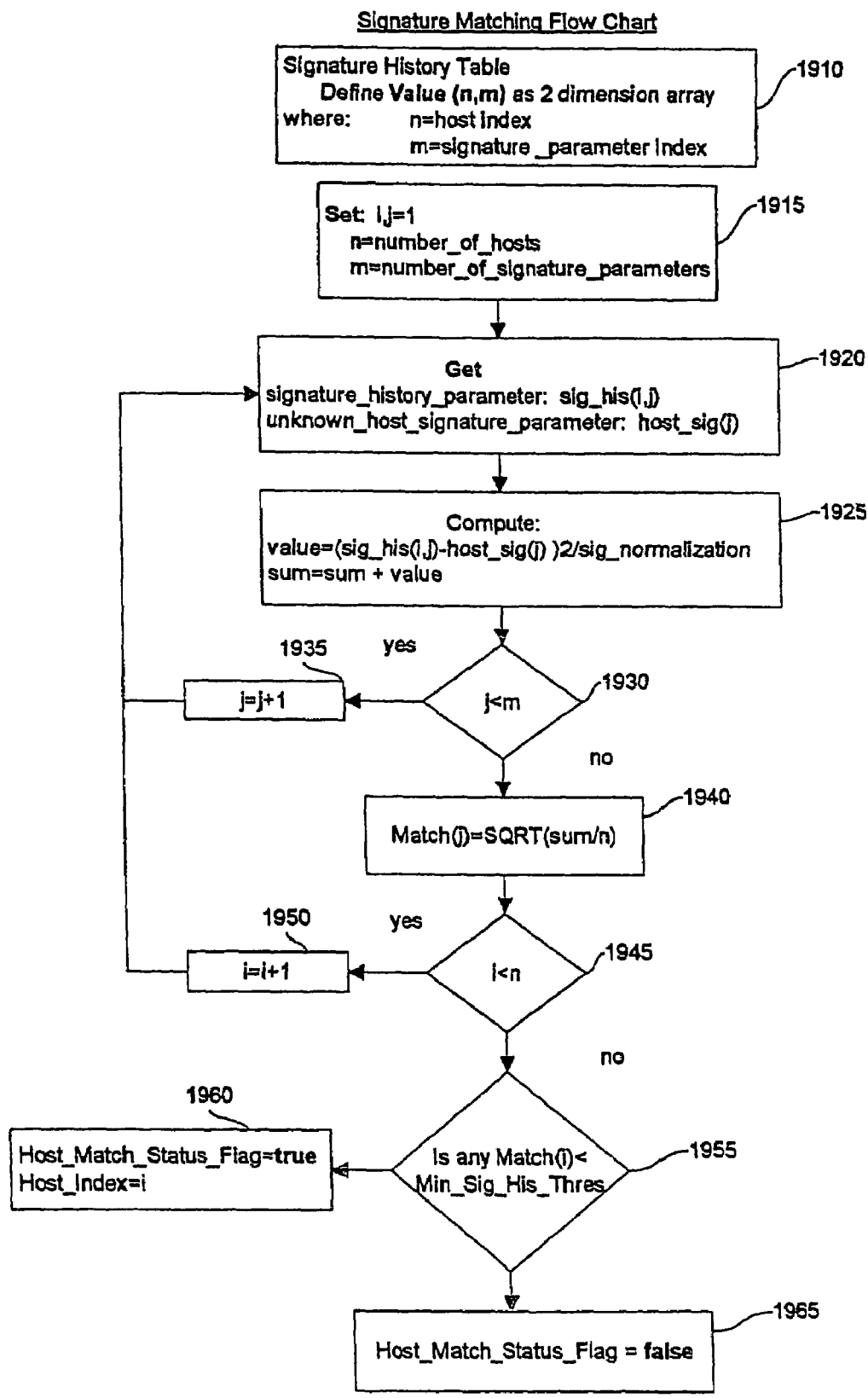
FIG. 18 is a flow diagram showing the signature matching process of the present invention.

FIG. 18 shows the process for signature matching. Commonly, a transmission is detected on the network but due to a collision or other noise, the source address can not be identified and decode even with the above described technique for packet decoding. Signature matching is a process by which the analog characteristics of the waveform are matched to known characteristics associated with each of the network transmitters to provide a prediction of the transmission's source.

In detail, a two dimensional array Value(n,m) is first constructed of the parameters calculated in Table I for each of the transmitters on the network, in steps 1910, 1915, from previous analysis. The rows of the array correspond to the different hosts and the columns correspond to the parameters set forth in Table I.

In steps 1920, 1925, 1930, and 1935, the parameters of a transmission, the source of which is unknown, are compared to the parameters held in the array value(n,m) for a host. The difference between the known host's parameter and the parameter from the known source is detected and then normalized. A sum is calculated for each host. In step 1940, the square-root of the sum divided by the number of parameters is stored to an array match(j). Steps 1945 and 1950 perform the comparison for every host in the value array.

In steps 1955, 1960, and 1965, a match is declared if any of the match indicators stored in Match(j) is less than a threshold. In the case of multiple sums satisfying the threshold, a probability for a match should be calculated.

The jitter in the transmitter clock can be determined by comparing the time between successive bits in the packet. The calculation is performed according to the following technique:

```
For j=0 to n-1 do
    Diff = Reference_Period –(((m_index(j+1) – m_index(j)) *
    Time_per_point)
    RMS_Jitter=RMS_Jitter + (Diff)²
    next j
    RMS_Jitter = SQRT(RMS_Jitter/n)
```

Reference_Period is the defined bit period for the network, which is 100 ns in a 10 MBPS network, for example. The number of samples between each pair of success bits is held in the m_index array and is subtracted from the reference_period. The result is multiplied by Time_per_point, which refers to the sampling period of the digitizer. The result is the time in seconds between successive bits. This series of differences is used to calculate an root-mean-square (RMS) jitter according to a standard formula. It should be noted that the resolution of the this technique, however, is limited by the size of Time_per_point.

b. Active Analysis Mode

Figure 19:
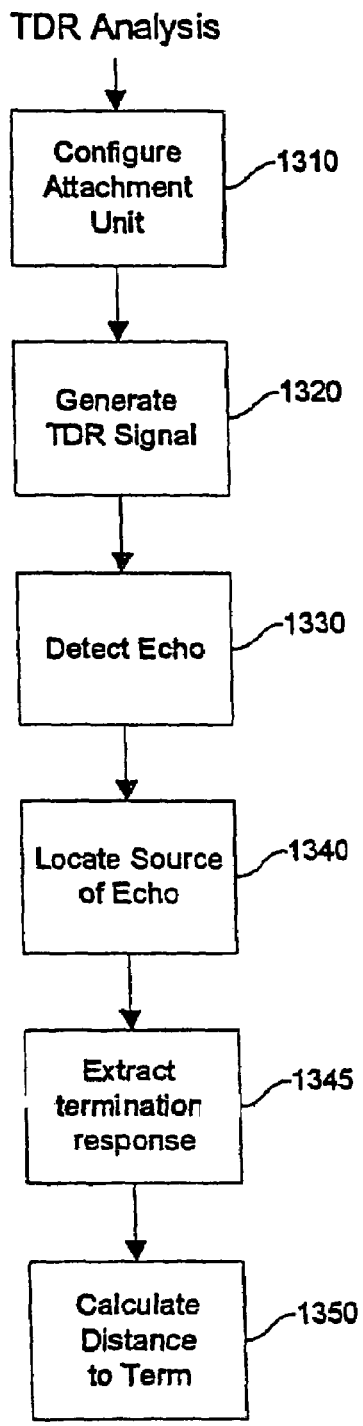
FIG. 19 shows the process steps performed in the TDR analysis mode in accordance with the invention.

FIG. 19 shows the steps involved in TDR analysis for the network. First, the attachment unit must be configured in step 1310. In 10Base(2) or (5), the driver 310 must merely be enabled and the packet/TDR generator 150 armed. The 10Base(T) attachment unit should be configured to provide the hybrid TDR signal on only one pair of wires, either Tx or Rx, of a link 22 and detect any echo on the wires. The system processor 120 accomplishes this by sending the proper address to one of the Rx or Tx selector circuits 470, 420 and the signal generation select 404. The Tx or Rx selector 420, 470 and signal generator select circuits 404 decode the address then send the proper enabling signal to the receiver and driver. If host transmit Tx conductors are being checked, then one Tx driver 414 and Tx receiver 416 should be enabled; if host receiver Rx conductor are being checked then one Rx driver 454 and Rx receiver 456 should be enabled.

The hybrid packet/TDR signal is then generated on the conductor pair of interest in step 1320. The digitizer 120 will be triggered by the timing and control circuit 264 to record the entire signal. Only the TDR portion is of interest, however, and specifically any echo in response to the TDR edge. The system processor 120 processes the data from the digitizer and locates this echo. By computing the time between the generation of the edge on the network and the return echo, the source of the echo is located in step 1340. The shape of the echo provides information about the cause. This information leads to the identification of the possible sources listed below in Table IV:

TABLE IV

Terminator Loose
Terminator Disconnected
Wrong Terminator Value
Extra Terminator
Cable With Open
Cable With Short
Bad Impedance TABLE IV-continued Length (Between Repeaters) too Long
Total Length Too Long
Cable Signature Bad
Split Pair: Reversed, Crossed
Excess Cross Connectors
Shielding defective In order to uniquely locate the position of any terminations on the network cabling, the TDR analysis mode also includes extracting the termination's response to the TDR signal in step 1345. Based on the delay from when the TDR signal was first injected into the cabling and the detection of the termination's response, the location of the termination can be uniquely determined or calculated in Step 1350.

Other types of active analysis are also possible. As discussed previously in connection with FIGS. 4A-D, the packet/TDR generator 150 has the capability of generating packets without the TDR edge, that conform with the network's protocol. For example, packets can be generated to collide with transmissions from other network sources to determine whether those sources properly react to the collision. In another type of analysis, packets are generated with a destination address of one of the other network nodes. The node's response can then be monitored to determine whether it reacts properly. The ability of other nodes to properly decode successive packets can also be assessed with the invention. Two packets are sent with a spacing either within the specification of 9.6 microseconds or less. In other examples, out of specification packets, with regard to frequency, can also be transmitted to determine whether or not the other network devices can properly lock onto the out of spec packets. Generally, these other modes of analysis are used either to test how well a particular network device is operating or further probe a possibly improperly operating network device to assess or predict failure modes.

c. Client/Server Embodiment

Figure 20:
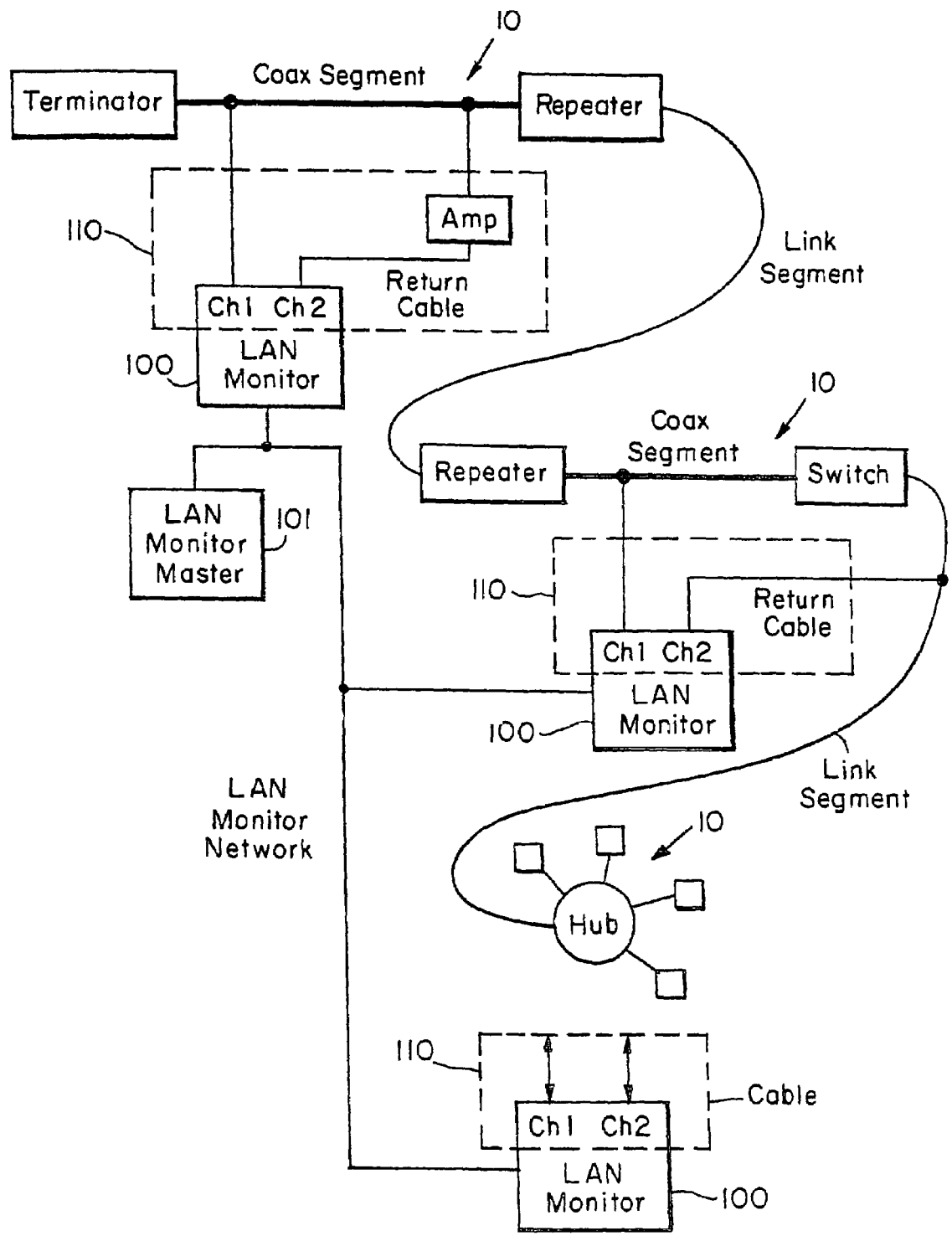
FIG. 20 is a schematic block diagram showing a client/server embodiment of the invention.

FIG. 20 is a schematic block diagram showing a client/server embodiment of the invention. A plurality of network diagnostic devices 100, including attachment units 110, as described above in FIGS. 1-19 are connected to separate local area networks 10 having bus and star topologies. The networks 10 are connected to each other via repeaters and switches. Each of the network diagnostic devices 100 download its acquired information to a central master monitor 101. Preferably, the transmission of information between devices 100 and master 101 occurs in a separate redundant wired or wireless network. It can alternatively be accomplished through the networks being monitored. Thus, an entire distributed network can be monitored and tested from a single device.

While this invention has been particularly shown and described with references to preferred embodiments thereof, it will be understood by those skilled in the art that various changes in form and detail may be made therein without departing from the spirit and scope of the invention as defined by the appended claims. For example, while the system has been described in connection with LANs, other data networks will benefit from the invention such as: Metropolitan Area Networks (MANs) and Wide Area Networks (WANs). Also, while the explanation is specific to 10Base(2), (5), or (T) networks, other protocols and media are possible such as ATM or FDDI, for example.

We claim:

1. A network analysis device for a digital data computer network, comprising: a digitizer which digitally samples analog characteristics of digital communication events between network devices connected to the network independently of packet contents associated with any of the digital communication events, the analog characteristics including a component of at least one of voltage and frequency, the samples taken at least at one of a rate and a resolution greater than is required to minimally detect digital transitions, wherein the samples are taken at a sampling frequency of at least approximately 500 megahertz; a system processor which downloads data of the sampled signal events from the digitizer, which analyzes the analog characteristics, and which decodes the signal events, which are digital communications between the devices, based on the data, and wherein the system processor classifies the signal events as digital communications, noise, interference and/or crosstalk, wherein the system processor classifies the signal events as digital communications, noise, interference and/or crosstalk to selectively predict a failure mode.

2. A method for monitoring the operation of a computer network, comprising:
digitally sampling analog characteristics of signal events on the network with a digitizer independently of packet contents associated with any of the signal events, the analog characteristics including a component of at least one of voltage and frequency, the sampling taking place at least at one of a rate and a resolution greater than is required to minimally detect digital transitions, wherein the samples are taken at a sampling frequency of at least approximately 500 megahertz;
downloading data arrays of the signal events to a system processor;
analyzing the data arrays in the system processor to identify the signal events;
determining analog characteristics of the signal events; and
decoding the signal events, which are digital communications between network devices, based on the data, to selectively predict a failure mode.

3. A method as described in claim 2, further comprising classifying the events as collisions between network devices;
determining transmission start and stop times for colliders in collision signal events.

4. A method as described in claim 2, further comprising locating network devices that improperly react to collisions with other network devices by reference to the start and stop times.

5. A method as described in claim 2, further comprising identifying sources of transmissions on a network by calculating parameters for transmissions from known sources, calculating the parameters for a transmission from an unknown source, and identifying the unknown source based upon the degree to which the parameters match parameters from the known sources.

6. A method as described in claim 2, further comprising classifying the signal events as digital communications, noise, interference and/or crosstalk based on the analog characteristics.

7. A method as described in claim 1, further comprising classifying the signal events as digital communications, noise, interference and/or crosstalk based using parametric analysis of each event.

8. A method as described in claim 1, further comprising simultaneously connecting to multiple links of the network.

9. A method as described in claim 1, further comprising simultaneously connecting to multiple links of a star topology network.

10. A method as described in claim 9, further comprising tagging sampled signal events to identify the link from which the event originated.

11. A method as described in claim 9, further comprising determining whether the network communications are within frequency and voltage specifications for the network.

12. A method as described in claim 9, further comprising analyzing transmission characteristics of the network analysis by driving a predetermined signal out onto the network and detecting the response of the network.

* * * * *